United States Patent
Takeuchi et al.

(10) Patent No.: US 6,721,168 B2
(45) Date of Patent: Apr. 13, 2004

(54) ELECTRIC DOUBLE-LAYER CAPACITOR AND CARBON MATERIAL THEREFOR

(75) Inventors: Makoto Takeuchi, Tokyo (JP); Katsumi Koike, Tokyo (JP); Akinori Mogami, Tokyo (JP); Takamichi Maruyama, Tokyo (JP)

(73) Assignee: JEOL Ltd., Tokyo (JP)

( * ) Notice: Subject to any disclaimer, the term of this patent is extended or adjusted under 35 U.S.C. 154(b) by 151 days.

(21) Appl. No.: 09/897,726

(22) Filed: Jul. 2, 2001

(65) Prior Publication Data

US 2002/0039275 A1 Apr. 4, 2002

(51) Int. Cl.[7] ................................. H01G 9/00
(52) U.S. Cl. ............... 361/502; 361/503; 361/504; 361/508; 361/516; 29/25.03; 429/329; 429/341
(58) Field of Search .................... 361/502, 503, 361/504, 508, 509, 512, 523, 528, 513, 516, 510; 429/329, 341

(56) References Cited

U.S. PATENT DOCUMENTS

| | | | | |
|---|---|---|---|---|
| 4,562,511 A | * | 12/1985 | Nishino et al. | |
| 5,874,184 A | * | 2/1999 | Takeuchi et al. | |
| 5,888,673 A | * | 3/1999 | Kawasato et al. | |
| 5,907,472 A | * | 5/1999 | Farahmandi et al. | |
| 6,099,990 A | * | 8/2000 | Denton, III et al. | |
| 6,303,249 B1 | * | 10/2001 | Sonobe et al. | |
| 6,479,192 B1 | * | 11/2002 | Chung et al. | |

* cited by examiner

*Primary Examiner*—Dean A. Reichard
*Assistant Examiner*—Nguyen T. Ha
(74) *Attorney, Agent, or Firm*—Webb Ziesenheim Logsdon Orkin & Hanson, P.C.

(57) ABSTRACT

The present invention provides a novel electric double-layer capacitor made of a carbon material having characteristics entirely different from those of the prior art activated carbon. The capacitor develops a capacitance by a mechanism entirely different from the mechanism of an electric double-layer capacitor using activated carbon. The novel capacitor has improved performance including capacitance. The capacitor has polarized electrodes immersed in an organic electrolyte. The electrodes are made of a nonporous carbon having crystallites of graphite-like carbon. When a voltage is applied, electrolyte ions are intercalated between the layers of the crystallites of the graphite-like carbon together with the solvent. Thus, electric double layers are formed. Intercalation is induced by the first cycle of charging. In the second and following cycles, the capacitance is developed.

6 Claims, 20 Drawing Sheets

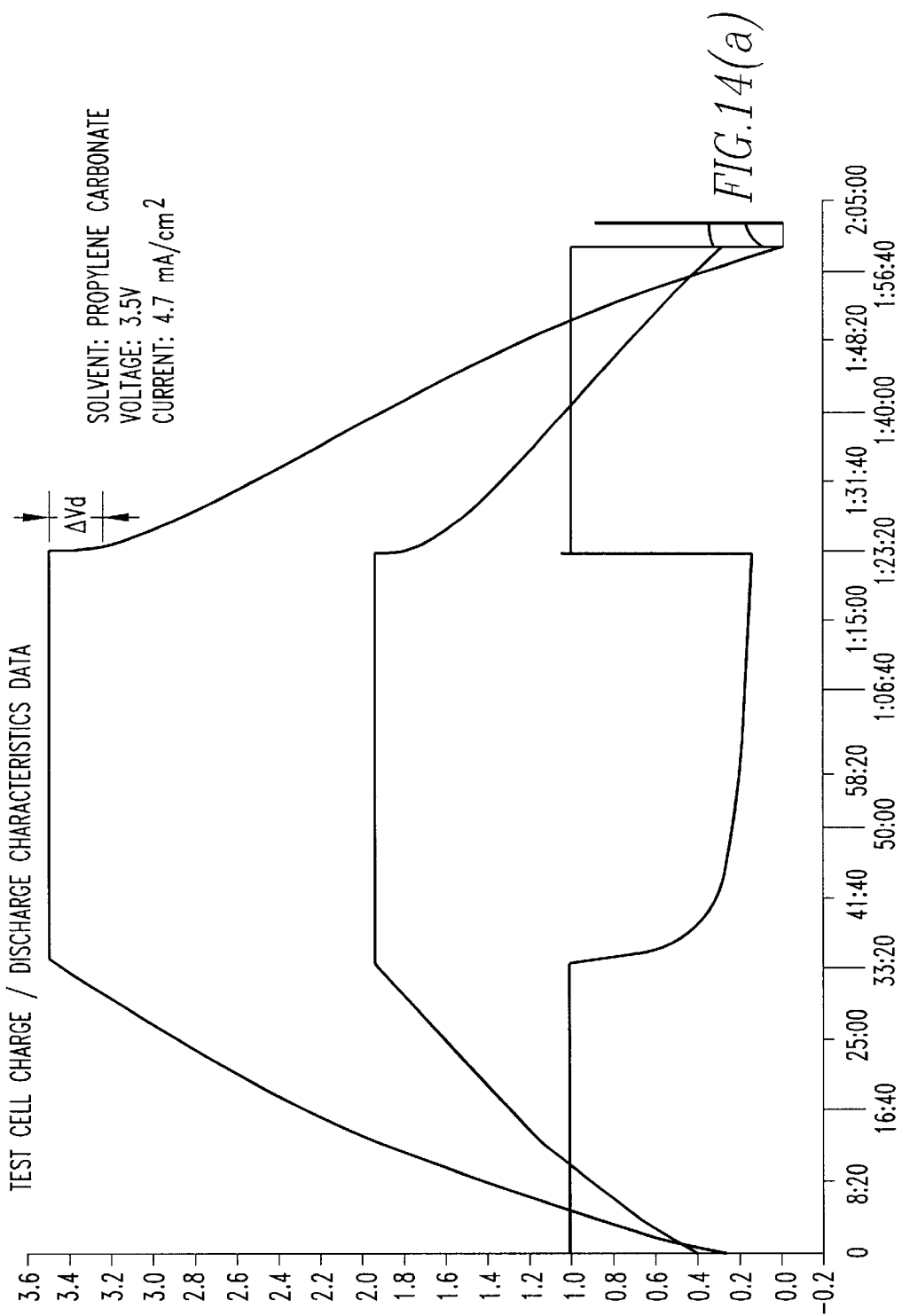

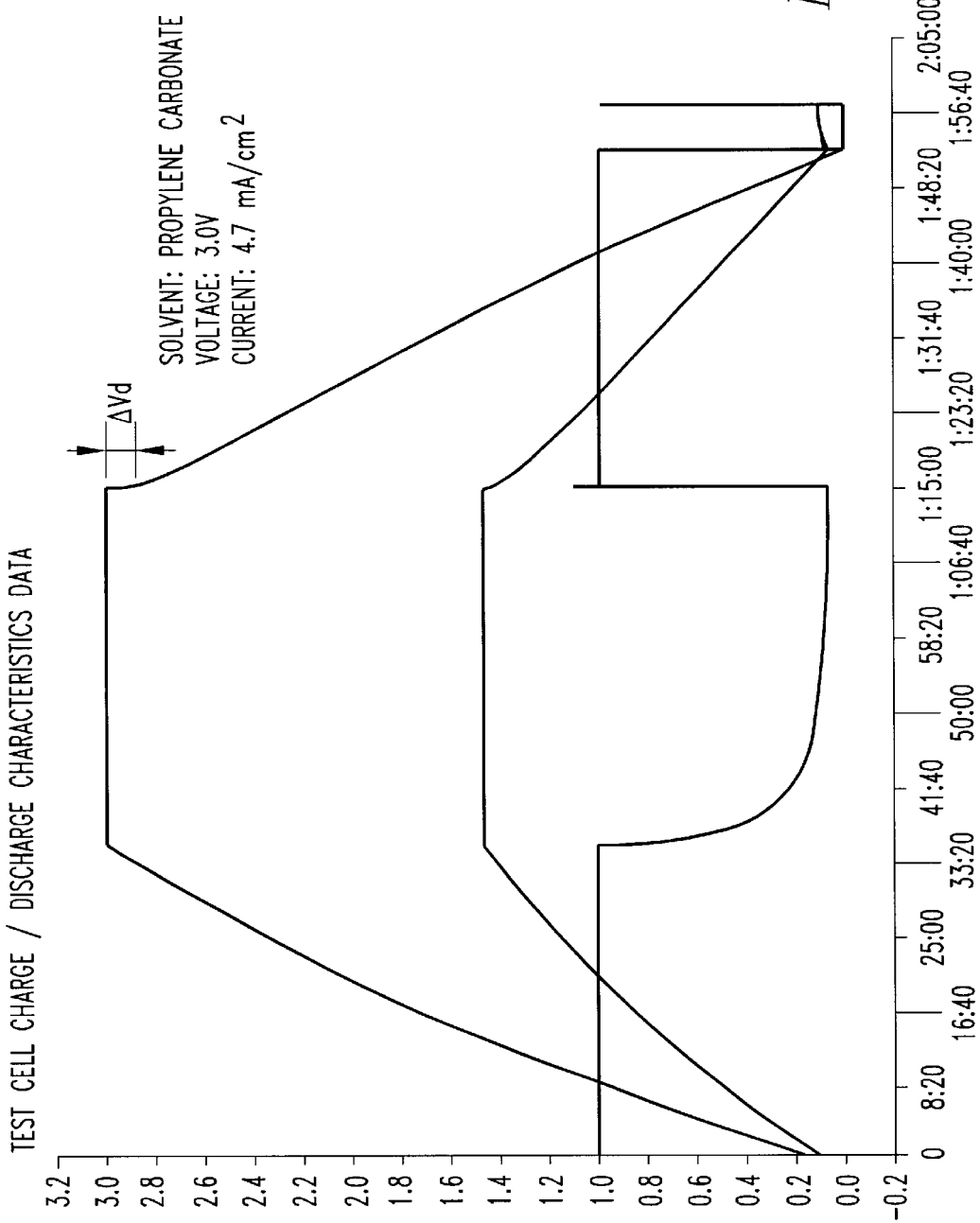

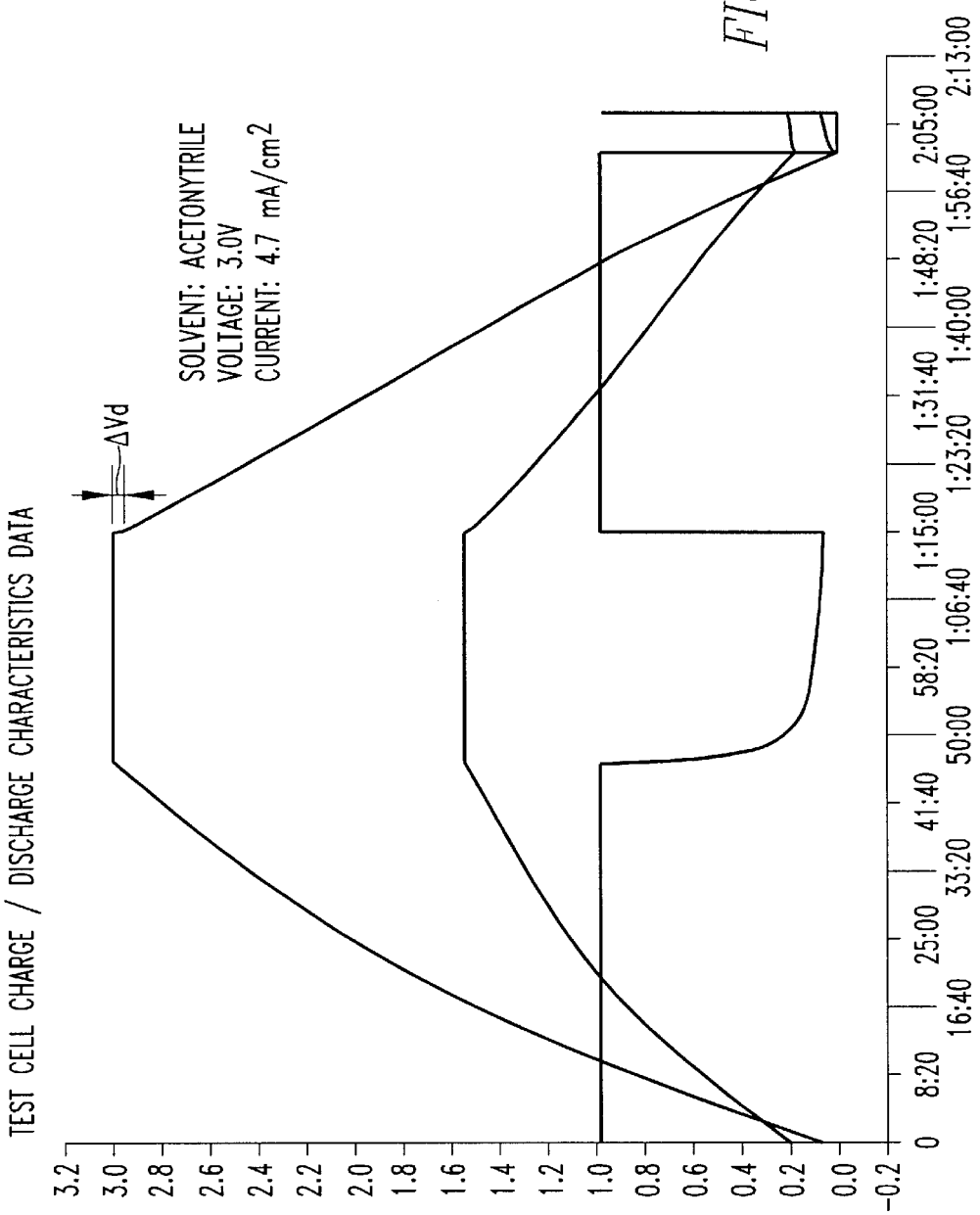

ELECTRIC DOUBLE-LAYER CAPACITOR AND CARBON MATERIAL THEREFOR

BACKGROUND OF THE INVENTION

1. Field of the Invention

The present invention relates to an electric double-layer capacitor using a certain carbon material and, more particularly, to a carbon acting as an active material used in polarized electrodes that are employed in an electric double-layer capacitor. The invention relates also to a method of fabricating the aforementioned carbon, a method of selecting the constituent materials of an electrolyte solution for use in an electric double-layer capacitor, a method of fabricating such an electric double-layer capacitor, and its usage.

2. Description of the Related Art

Electric double-layer capacitors (also known as supercapacitors, ultracapacitors, pseudocapacitors, hybrid capacitors, or electrochemical capacitors) capable of being charged and discharged with large currents are promising as electric power storage devices that are frequently charged and discharged such as batteries for electric vehicles, auxiliary power supplies for solar batteries, and auxiliary power supplies for wind generators. Therefore, there is a demand for an electric double-layer capacitor having a high energy density, being capable of being quickly charged and discharged, and having excellent durability (see, for example, "Fourth Symposium On State-Of-The-Art Techniques Regarding EV/HEV: Present Situation Of Capacitor Technologies And Problems To Be Solved", Executive Committee On "International Symposium On State-Of-The-Art Techniques Regarding Batteries For Electric Vehicles", Nov. 8, 1999).

In an electric double-layer capacitor, a pair of polarized electrodes are located opposite to each other via a separator within an electrolyte solution to form positive and negative electrodes. In principle, electric charge is stored in an electric double-layer formed at the interface between each polarized electrode and the electrolyte solution. Accordingly, only activated carbon having a large specific surface area has been used in the past because it has been considered that the capacitance of the electric double-layer capacitor is roughly proportional to the surface area of the polarized electrodes.

In other words, a substance having a maximum surface area per unit weight has been selected as the material of the polarized electrodes because the electric double-layer capacitor is formed at the interface between a conductive material in solid phase and an electrolyte solution. In practice, the aforementioned "per unit weight" should be read as "per unit volume", since the space consisting of thin holes between the carbon particles forming the electrode and inside the carbon particles is filled with the electrolyte solution and the weight of the electrolyte solution is added.

Such activated carbon is fabricated by carbonizing a carbonaceous material at a temperature lower than 500° C. and then activating the material. The activating operation is carried out, for example, by heating the material to 600° C. to 1000° C. within an atmosphere of water vapor, carbon dioxide, or the like or mixing zinc chloride, potassium hydroxide, or the like into the material and heating the mixture within an inert atmosphere. Micropores are created by the activating process, thus increasing the specific surface area of the activated carbon. Specific surface areas measured by a BET gas absorption measurement method are generally about 1,000 to 2,000 $m^2/g$.

On the other hand, it has already been proposed to provide a novel polarized electrode made of a carbon having a specific surface area of about 300 to 400 $m^2/g$ and an interplanar spacing (inter-layer distance) ($d_{002}$) of 0.365 to 0.385 nm in order to obtain an electric double-layer capacitor having a large capacitance (Japanese patent laid-open No. 11-317333). In particular, an easily graphitizable carbon containing a large amount of crystallites of a multilayer graphite structure having a well developed carbon mesh surface structure is prepared. This carbon is dry distilled at 700 C. to 850 C. to remove the volatile components. The remaining material is thermally treated together with KOH at 800 C. Using this carbon, an improvement of about 40% in capacitance over the electric double-layer capacitor using the prior art activated carbon has been accomplished.

However, the electric double-layer capacitor proposed by the present applicant as mentioned above suffers from some difficulties. That is, the capacitance decreases during repeated use. This involves generation of gas. Also, the internal resistance increases. In addition, the mechanism of capacitance production is not understood.

SUMMARY OF THE INVENTION

Accordingly, it is an object of the present invention to provide an electric double-layer capacitor which is free of the foregoing problems and has improved energy density and power density.

We have considered the capacitance generation mechanism of the above-described carbon fabricated by the aforementioned method from an easily graphitizable carbon in which crystallites of the multilayer graphite structure described above have developed. That is, a large capacitance is created despite the fact that the surface area is small. We have analyzed the cause of generation of gas when the capacitor is operated at a voltage of 3.0 V or higher and the cause of deterioration of the characteristics.

Thus, it is a more specific object of the invention to provide an electric double-layer capacitor which has an improved capacitance per unit volume, improved repeated use durability at an operating voltage of 3.0 V or higher, a decreased internal resistance, and an enhanced power density, and which can be quickly charged and discharged.

It is important to improve the stability of the capacitance value and the usable voltage when improving the energy density. It is important that the response speed is improved and the internal resistance is reduced when enhancing the power density.

In summary, the present invention provides a novel electric double-layer capacitor which uses a carbon material entirely different in characteristics from those of the prior art activated carbon and which produces a capacitance by a mechanism entirely different from the capacitance generation mechanism of an electric double-layer capacitor using the prior art activated carbon.

We have found that an improved capacitance is obtained by preparing an easily graphitizable carbon in which crystallites of multilayer graphite have developed, dry distilling the carbon at 700° C. to 850° C., treating the resulting carbon together with a caustic alkali such as KOH at 800° C. to 900° C., removing the remaining alkali with heated water vapor, and using the obtained carbon. Furthermore, we have discussed the large capacitance generation mechanism of the electric double-layer capacitor using this carbon. Additionally, we have found various factors such as polarized electrodes used for the capacitor (i.e., the carbon electrodes) and solvents to impart higher energy density (given in Wh/Kg) and higher power density (given in W/Kg) to the electric double-layer capacitor. In this way, the present invention has been completed.

That is, the electric double-layer capacitor in accordance with the present invention has an organic electrolyte in which polarized electrodes are immersed. A carbon is used as a substance for activating the polarized electrodes and contains graphite-like crystallites of carbon. This carbon is a nonporous carbon having an interplanar spacing $d_{002}$ of greater than 0.360 nm. Unlike the prior art activated carbon, at the beginning of assembly of a capacitor, the nonporous carbon has substantially no interface forming an electric double layer. When the applied voltage exceeds a certain threshold voltage during initial charging, ions of the electrolyte intrude into the carbon structure, together with the solvent. This phenomenon is known as solvent co-intercalation. This is the first time that an interface creating an electric double layer is formed. Subsequently, this interface is maintained by the hysteresis effect. The electric double-layer capacitor functions well.

Where an electrolyte solution including a solvent having a small molecular volume such as acetonitrile is used at this time, the solvent acts as a carrier having a high mobility into the carbon structure. Hence, the internal resistance can be reduced further. In addition, the power density can be enhanced further.

The "nonporous carbon" referred to herein is a carbon that can be obtained by the aforementioned method, for example. That is, the carbon does not have pores in sizes capable of accepting various kinds of electrolyte ions, solvents, $N_2$ gas, and so on. The specific surface area measured by the BET method is less than 270 $m^2/g$, more preferably less than 100 $m^2/g$. Preferably, the interplanar spacing $d_{002}$ of the carbon crystallites is in the range of 0.360 to 0.380 nm.

The nonporous carbon fabricated as described above has a hetero element-containing functional group such as COOH or CHO on its surface. The functional group is produced on the surface after an alkali treatment. This hetero element-containing functional group is removed by a thermal treatment at 500° C. to 900° C. within a reducing (redox) atmosphere such as a stream of $H_2$ or a mixture gas of $H_2$ and $N_2$ obtained by decomposing $NH_3$. In this way, the characteristics of the electric double-layer capacitor can be improved further.

The removal of the hetero element-containing functional group within carbon can be confirmed from the amount of hydrogen directly bonded to the carbon skeleton, the amount of hydrogen existing as chemically bonded, adsorbed water, and the amount of hydrogen existing as physically adsorbed water. These kinds of hydrogen in different states are present within the carbon. The amount of hydrogen directly bonded to the carbon skeleton appears as a short relaxation time component $T_2=18$ to 50 $\mu$sec (Gaussian type) during observation of $^1H$ resonance of powdered carbon by pulse NMR as described later. The aforementioned chemically bonded, adsorbed water appears as a moderate relaxation time component $T_2=100$ to 400 $\mu$sec (Lorentzian type). The last-mentioned physically bonded, adsorbed water appears as a long relaxation time component $T_2=500$ to 2000 $\mu$sec or longer (Lorentzian type).

The intercalation mechanism of the electrolyte ions into the carbon structure as described above is similar to the mechanism of a carbon mesh plane adopted as the negative electrode of a lithium ion secondary battery. This carbon mesh plane has grown to some extent but its interplanar spacing is greater than that of graphite ($d_{002}$ is greater than 0.337 nm) (for example, Japanese patent laid-open No. 145009/1999). This carbon barely reacts with the electrolyte solution, and lithium is occluded between the layers of the carbon. The present invention differs from the case of lithium ions in the following respects. The carbon has a greater interplanar spacing. Electrolyte ions are intercalated together with the solvent. This solvent exists between the layers without being decomposed unlike lithium ions. In addition, the solvent acts as a medium when ions go in and out. The intercalation increases the interplanar spacing. When a voltage is applied, the volume increases conspicuously. Moreover, the internal resistance is noticeably lower.

The nonporous carbon in accordance with the present invention increases in volume when a voltage is applied as described above. However, if a pressure that resists the pressure produced by the expansion is applied from the outside, and if the volume increase of the electrodes is suppressed completely, the capacitance produced between the electrodes remains the same as the case where free expansion is permitted. This fact reveals that the electric field application strongly urges the electrolyte ions to be intercalated between the layers together with the solvent.

If the distance between the current collectors is fixed during assembly of the electric double-layer capacitor, it follows that a pressure is applied to the current collectors because of expansion of the volume of the nonporous carbon, which in turn is caused by application of a voltage. This pressure is referred to as "expansion pressure". This expansion pressure can be checked by mechanically holding the outside of each electrode such that the length of the assembled capacitor taken in the direction of the electric field is kept constant and measuring the produced pressure with a pressure sensor such as a strain gauge. It is observed that a positive correlation exists between the measured expansion pressure and the capacitance of the electric double-layer capacitor. Preferably, the capacitor produces an expansion pressure exceeding 2 $kg/cm^2$.

As described above, the electric double-layer capacitor in accordance with the present invention produces a capacitance by a mechanism different from the mechanism of an electric double-layer capacitor using the prior art activated carbon.

In particular, the electric double-layer capacitor in accordance with the present invention is an organic solvent-based electric double-layer capacitor using an organic electrolyte solution in which polarized electrodes are immersed. The polarized electrodes have crystallites of graphite-like carbon, and are made of a nonporous carbon having a specific surface area of less than 100 $m^2/g$. The interplanar spacing $d_{002}$ of the crystallites of the carbon is 0.360 to 0.380 nm.

From the nonporous carbon used in the electric double-layer capacitor in accordance with the present invention, hydrogen and oxygen atoms are removed except for hydrogen atoms directly bonded to the carbon skeleton. The reactive portions which would normally react with oxygen and water in air are terminated or blocked off by being replaced by hydrogen atoms. The difference between the bond states of hydrogen atoms remaining in the carbon structure can be found from the three relaxation time constants. That is, the short relaxation time component $T_2=20$ to 50 $\mu$sec (Gaussian type) is observed at $^1H$ resonance by means of pulse NMR. The moderate relaxation time component is $T_2=100$ to 400 $\mu$sec (Lorentzian type). The long relaxation time component is $T_2=500$ to 2000 $\mu$sec or longer (Lorentzian type). This carbon can be confirmed when the ratio of the sum of the moderate and long relaxation times to the short relaxation time is less than one third. The capacitor is characterized in that the polarized electrodes are made of the carbon having these characteristics.

Where such relaxation times including the short, moderate, and long relaxation times $T_2=20$ to $50\ \mu\text{sec}$ (Gaussian type), $T_2=100$ to $400\ \mu\text{sec}$ (Lorentzian type), and $T_2=500$ to $2000\ \mu\text{sec}$ or longer (Lorentzian type), respectively, are observed at $^1\text{H}$ resonance at room temperature by pulse NMR, if the ratio of the sum of the moderate and long relaxation times to the short relaxation time is less than one third, and if this carbon is used in an electric double-layer capacitor, it means that the selected carbon produces no gas during discharge, suffers from no attenuation of capacitance, and exhibits no increase in internal resistance. That is, this relation can be used as an index in selecting such an appropriate carbon. This index can be used in manufacturing an electric double-layer capacitor employing the prior art activated carbon, as well as in fabricating an electric double-layer capacitor using the nonporous carbon in accordance with the invention.

It is known, however, that it is essential to remove the hydrogen of the physically adsorbed water appearing as a relaxation time component $T_2=500\ \mu\text{sec}$ to milliseconds (Lorentzian type) (normally, 600 to 2000 $\mu\text{sec}$), in order to maintain the characteristics of the organic solvent-type electric double-layer capacitor. In the past, such physically adsorbed water has been removed from the electrodes during assembly of the electric double-layer capacitor by vacuum degassing or other method. Therefore, these long relaxation time components do not normally exist. A carbon material that is used in electrodes in practice is required to satisfy the relation that the ratio of the moderate relaxation time component to the short relaxation time constant is less than one third.

Each polarized electrode of the electric double-layer capacitor in accordance with the present invention is fabricated by kneading together a nonporous carbon, a conduction-assisting agent, and a bonding agent and rolling the mixture into a sheet. Alternatively, after the kneading, the kneaded mixture is applied to a current collector. The polarized electrode is characterized in that the density of the obtained carbon electrode per apparent volume of the carbon electrode is 0.8 to 1.3 g/cm$^3$. The density is measured from the weight when the electrode is in a dry state.

The electrolyte solution of the electric double-layer capacitor in accordance with the present invention is an aprotic solvent solution containing more than 0.5 mol/liter of an electrolyte selected from the group consisting of boric tetrafluoride salts of alkyl quaternary ammonium, phosphate hexafluoride salts, and perchlorate salts. The solvent has been prepared by selecting at least one from propylene carbonate (PC), ethylene carbonate (EC), dimethyl carbonate (DMC), diethyl carbonate (DEC), dimethoxyethane (DME), diethoxyethane (DEE), and γ-butyl lactone (γ-BL) as a solvent or a mixture solvent and compounding at least 30% molar fraction of acetonitrile (ACN) or a solvent having a molecular volume of less than 71 and a relative dielectric constant of more than 20.

That is, the selection of the electrolyte and the solvent forming the electrolyte solution depends on the intercalation mechanism in accordance with the present invention. Namely, the electrolyte ions are intercalated between the layers of the carbon together with the solvent. By selecting the electrolyte and solvent, the response speed can be increased, and the internal resistance can be decreased. As a result, an electric double-layer capacitor having an improved power density can be obtained.

Examples of alkyl quaternary ammonium electrolytes include $Me_4N^+$, $Et_nMe_{4-n}N^+$, $Et_4N^+$, and $(n\text{-Bu})_4N^+$. Examples of solvent having a molar molecular volume of less than 71 and a relative dielectric constant of more than 20 include propionitrile, ethylene carbonate, dimethyl sulfoxide, and nitromethane, as well as acetonitrile. Of these solvents, acetonitrile and propionitrile are preferred in that they have low viscosities, high decomposition voltages, and nearly equal DN value (solvent parameter electron donability) and AN value (solvent parameter electron acceptability).

The carbon electrode for use in the electric double-layer capacitor in accordance with the present invention increases in volume when a voltage is applied. Where the volume increases, even if the capacitance of the capacitor increases, the capacitance per unit volume is canceled out. Accordingly, the electric double-layer capacitor in accordance with the present invention is characterized in that it is equipped with a volume-suppressing means for suppressing increase in volume in the direction of the electric field. Since the expansion pressure is mainly produced in the direction of application of the voltage, it is not necessary to provide any volume-limiting means acting in other than the direction of application of the voltage. Where a sheet of electrode is rolled and received in a cylindrical container as the volume-suppressing means for resisting the expansion pressure, for example, the volume can be suppressed by fabricating the cylindrical container from a polymer film such as fluorocarbon or polyimide having a high tensile strength, since the expansion pressure is directed toward the outer periphery from the center. In the case of a laminated planar electrode, the volume suppression can be accomplished by squeezing a sheet of electrode between highly rigid pressure plates and insert the sheet of electrode in a bag-like sheet of a polymer such as fluorocarbon, polyimide, or polyamide having a high tensile strength in the same way.

The present invention also embraces a nonporous carbon for use in the electric double-layer capacitor and a method of fabricating the nonporous carbon.

A method of producing a graphite-like nonporous carbon having crystallites of carbon, a specific surface area of less than 270 m$^2$/g (more preferably, less than 100 m$^2$/g), and a crystallite interplanar spacing $d_{002}$ of 0.360 to 0.380 um starts with dry distilling an easily graphitizable carbon having developed layers of crystallites of graphite at 700° C.–850° C. to obtain calcined carbon. The obtained calcined carbon is treated with a caustic alkali such as KOH, CsOH, or RbOH at 800° C. to 900° C. The remaining alkali is removed, for example, by water vapor under pressure. As an additional step, the obtained nonporous carbon is treated at 500° C.–900° C. within a reducing atmosphere (e.g., within a stream of hydrogen or within a mixture gas of $3H_2+N_2$ obtained by decomposing $NH_3$). Hydrogen and oxygen atoms excluding hydrogen atoms directly bonded to the carbon skeleton are removed. Also, radical electrons or trapped unpaired electrons, or reactive sites, that tend to react with oxygen and water within air are replaced by hydrogen atoms. In this way, hydrogenated nonporous carbon that is terminated or blocked off can be produced.

Strong alkalis such as LiOH, NaOH, KOH, CsOH, and RbOH can be used as the caustic alkali in the step described above. Where the sizes of ions are taken into consideration, KOH, CsOH, and RbOH are preferred among them. Furthermore, KOH is preferable in that it forms a charge transfer complex for promoting intercalation. In addition, KOH is preferable also from an economical point of view.

A carbon material in accordance with the present invention is a nonporous carbon for use in an electric double-layer capacitor and has crystallites of a graphite-like carbon and a specific surface area of less than 100 m$^2$/g. The interplanar spacing $d_{002}$ of the crystallites of the carbon is 0.360 to 0.380 nm. The hydrogen remaining in the carbon structure that is measured with $^1$H resonance by pulse NMR is characterized in that the ratio of the sum of middle and long relaxation time components to the short relaxation time component is less than one third. The short relaxation time component is given by $T_2$=18 to 50 $\mu$sec (Gaussian type). The moderate relaxation time component is given by $T_2$=100 to 400 $\mu$sec (Lorentzian type). The long relaxation time constant is given by $T_2$=500 to 2000 $\mu$sec (Lorentzian type). The present invention is hereinafter described in further detail.

BRIEF DESCRIPTION OF THE DRAWINGS

FIGS. 14(a), 14(b), 14(c) and 14(d) are graphs showing various internal resistances of an electric double-layer capacitor due to different solvent species;

DESCRIPTION OF THE PREFERRED EMBODIMENTS

To fabricate an electric double-layer capacitor (EDLC) in accordance with the present invention, a carbon for use in the capacitor is first prepared. Polarized electrodes, i.e., carbon electrodes, are fabricated from this carbon. A method of producing the carbon that is an active material, a method of fabricating the polarized electrodes, and characterization of the carbon are described below.

(1) Method of Producing Carbon and Characterization

Figure 1:
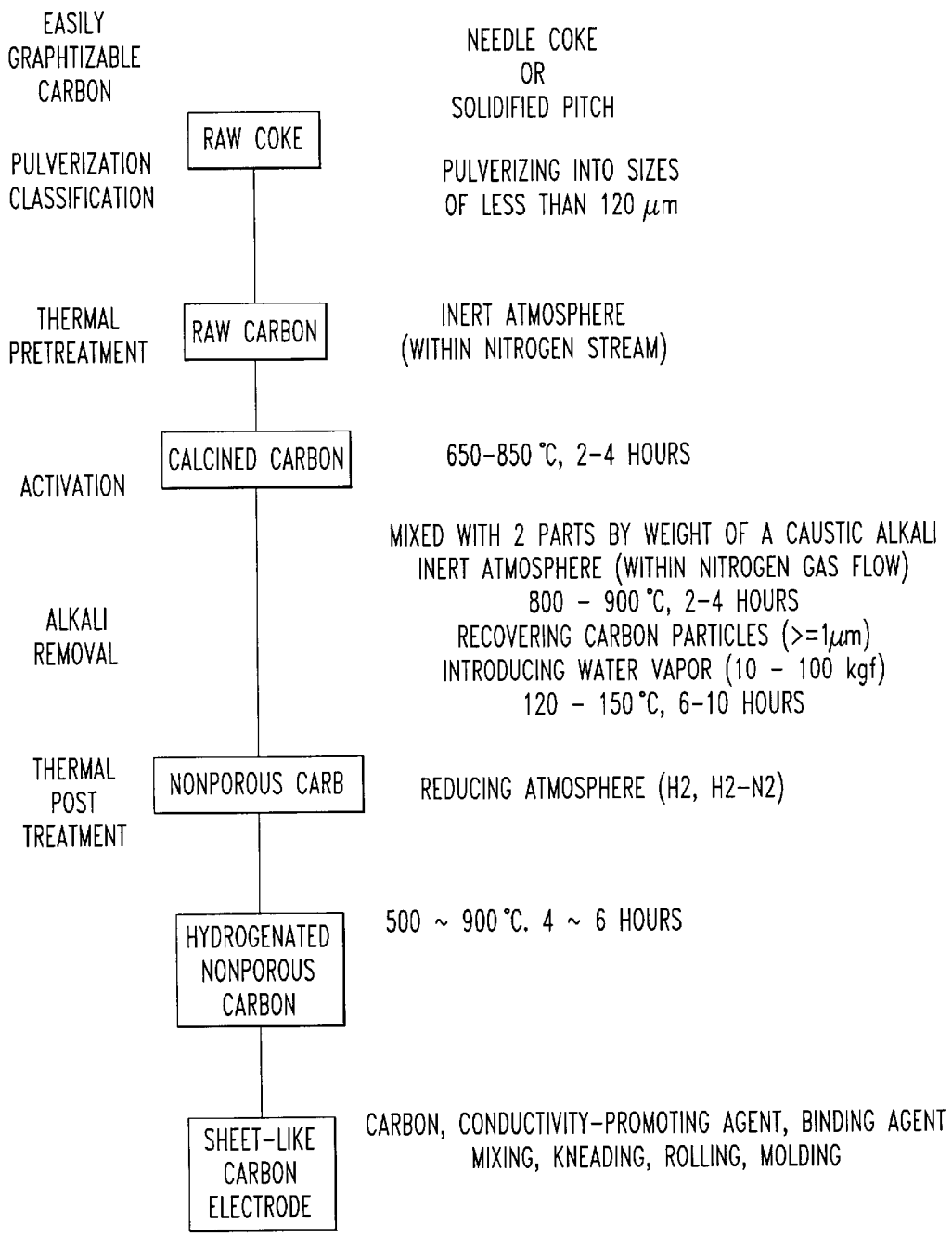
FIG. 1 is a flowchart schematically illustrating a process for fabricating a carbon electrode.

FIG. 1 is a flowchart illustrating a sequence of operations for fabricating carbon electrodes. To obtain the carbon in accordance with the present invention, needle coke or solidified pitch is dry distilled at 300° C.–400° C. to obtain an easily graphitizable carbon from which volatile components have been removed. This carbon is pulverized into sizes of less than 120 $\mu$m. In this way, a "raw carbon" is derived. This raw carbon is thermally treated within an inert atmosphere (e.g., within a nitrogen atmosphere) at 650° C.–850° C., preferably 700° C.–800° C., for 2 to 4 hours. This thermal treatment is herein referred to as the thermal pretreatment. In this manner, a "calcined carbon" is obtained. The obtained calcined carbon is mixed with 1.8–2.2 parts (preferably about 2 parts) by weight of a caustic alkali and again heated within an inert atmosphere (e.g., within a nitrogen atmosphere) at 800° C.–900° C. (preferably about 800° C.) for 2–4 hours to activate the mixture with the caustic alkali. Then, the alkali remaining in the carbon is removed in the manner described below.

The alkali is removed by washing the carbon after the alkali activation. The washing can be carried out, for example, by recovering carbon particles with sizes more than 1 μm from the alkali-treated carbon, loading them into a column of stainless steel, and keeping introducing water vapor under pressure of 10–100 kg • f, preferably 10–50 kg • f into the column at 120° C.–150° C. until the pH of the discharged water becomes about 7. This process is usually effected for 6 to 10 hours. After the end of the alkali removal, an inert gas such as argon or nitrogen is passed through the column to dry it, thus obtaining the desired carbon.

The caustic alkali used in the above-described process step is preferably KOH, CsOH, or RbOH as mentioned previously. Powder or aqueous solution of these caustic alkalis is dispersed in powdered carbon and heated at 800° C.–900° C. in an inert atmosphere for 2–4 hours to perform alkali activation. The caustic alkali dispersed in the powdered carbon is chemically reduced by carbon and partially assumes a metallic state. With respect to these caustic metals, the boiling points of metals K, Cs, and Rb are about 758° C., 668° C., and 687° C., respectively. Therefore, the structure of carbon itself is not varied so much at temperatures of 800° C.–900° C. at which a thermal treatment is made. At these temperatures, these metals assume the form of vapor and can penetrate deep into the carbon structure. Consequently, the alkali activation functions well. The effects of the alkali activation are especially conspicuous in the case of KOH. Furthermore, KOH is cheap. Hence, it can be said that KOH is a favorable caustic alkali.

The carbon obtained as a result of the process sequence described thus far has a specific surface area of less than 270 $m^2/g$. The interplanar spacing $d_{002}$ of the crystallites of the carbon is 0.360 to 0.380 nm. The carbon is nonporous carbon that does not have any pores large enough to accept various electrolyte ions, solvents, and $N_2$ gas. The specific surface area can be determined by the BET method (110° C.) using $N_2$ as an adsorbent. The interplanar spacing can be determined by powder X-ray diffraction (XRD).

As described thus far, needle coke or solidified pitch is used as a raw material, for example. The raw material is thermally treated at 650° C.–850° C. within a stream of nitrogen for 2 to 4 hours. Multilayer crystallites of graphite already developed internally slacken slightly. Volatile substances are released from other disordered layer structures. If a thermal treatment with a caustic alkali (KOH) is performed, the interplanar spacing increases further. This process was examined by X-ray diffraction. One of the results is shown in FIG. 2.

If the raw material consisting of carbon is thermally treated at 800° C. directly together with KOH, pores are created, and activated porous carbon is formed. If the aforementioned thermal treatment is effected at 1000° C. or higher, slackening of the carbon structure due to the thermal treatment with KOH hardly occurs. Accordingly, it can be seen that the degree of the thermal pretreatment made prior to the alkali treatment is of importance.

Figure 2:
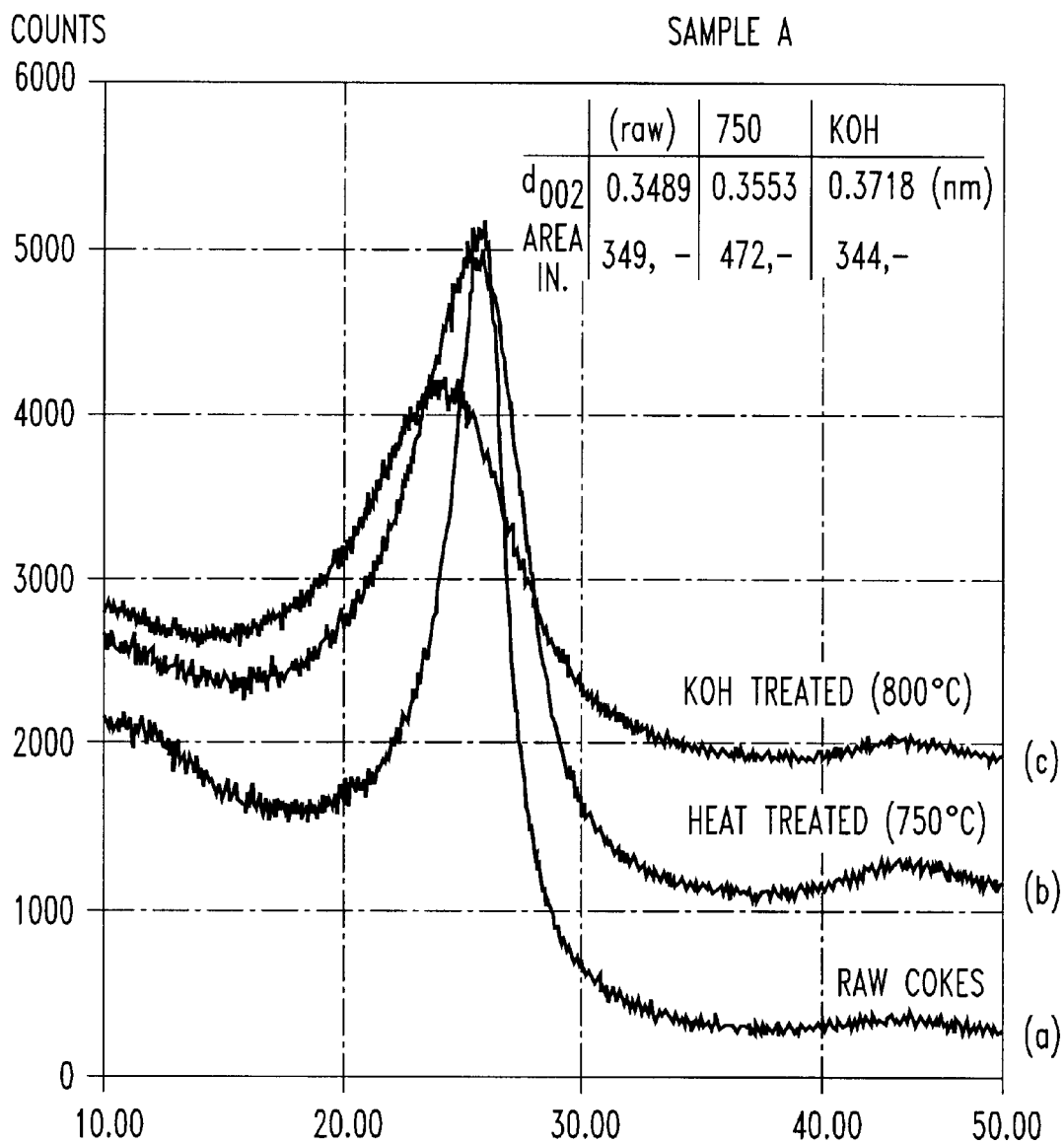
FIG. 2 shows XRD (X-ray diffraction) spectra illustrating the results of XRD measurements showing variations in interplanar spacing $d_{002}$ of raw carbons during processing, and in which curve (a) indicates an XRD spectrum derived from a petroleum-based needle coke A (raw material), curve (b) indicates an XRD spectrum derived from calcined carbon [A754], and curve (c) indicates an XRD spectrum derived from nonporous carbon [A754804]

FIG. 2 is a diagram illustrating the results of X-ray diffraction measurements showing variations of interplanar spacing $d_{002}$ of raw carbon when it is being processed. In FIG. 2,(a) indicates an XRD spectrum of petroleum-based needle coke A [A], (b) indicates an XRD spectrum of a calcined carbon [A754] produced by dry distilling the coke at 750° C. for 4 hours, (c) indicates an XRD spectrum of a nonporous carbon [A754804] obtained by thermally treating the calcined carbon together with two parts of KOH at 800° C. for 4 hours and then removing the alkali component. As can be seen from the diagram, the interplanar spacing $d_{002}$ gradually increases during the process described above. Also, it can be observed that rising of the baseline due to amorphous components within the carbon distributed around 2θ=10° decreases gradually. The XRD measurements were made using powdered samples and $CuK_\alpha$-line within air. The target was made of Cu, and the excitation voltage was 30 kV.

It is considered that the role of the alkali (such as KOH) in the above-described activation is not only to remove portions that would otherwise form pores to thereby increase the interplanar spacing but also to perform some activation that assists electrolyte ions to intrude (intercalate) between layers electrochemically.

Figure 3A:
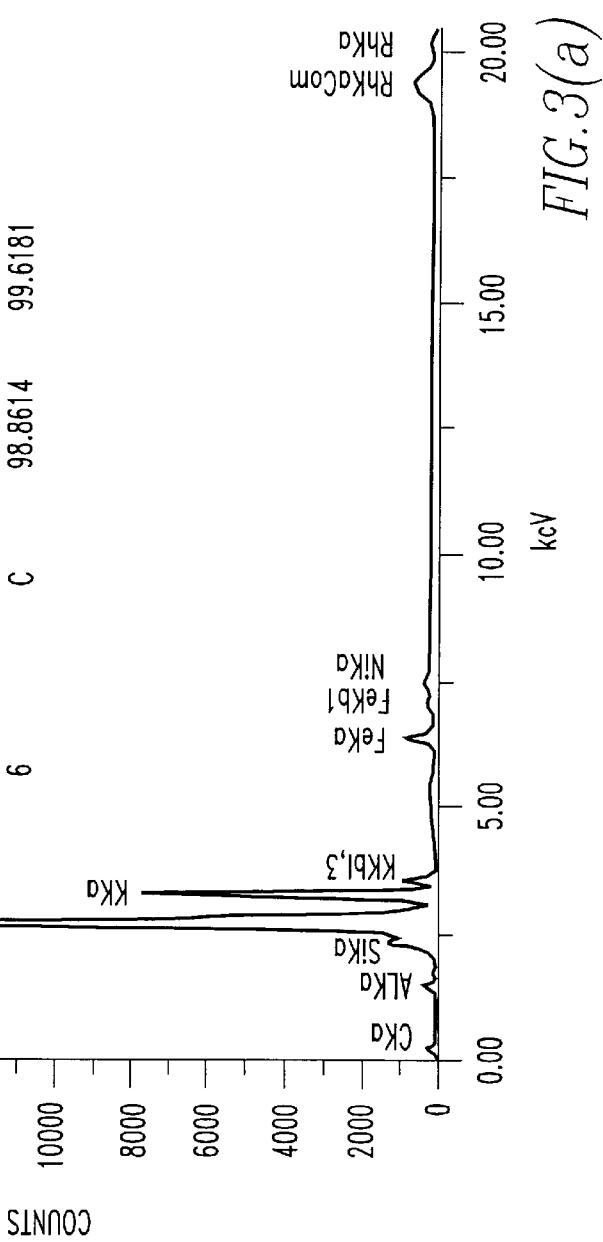
FIG. 3(a) is a fluorescent X-ray spectrum of a nonporous carbon [A752802], showing the results of an X-ray fluorescence elemental analysis of the carbon.
Figure 3B:
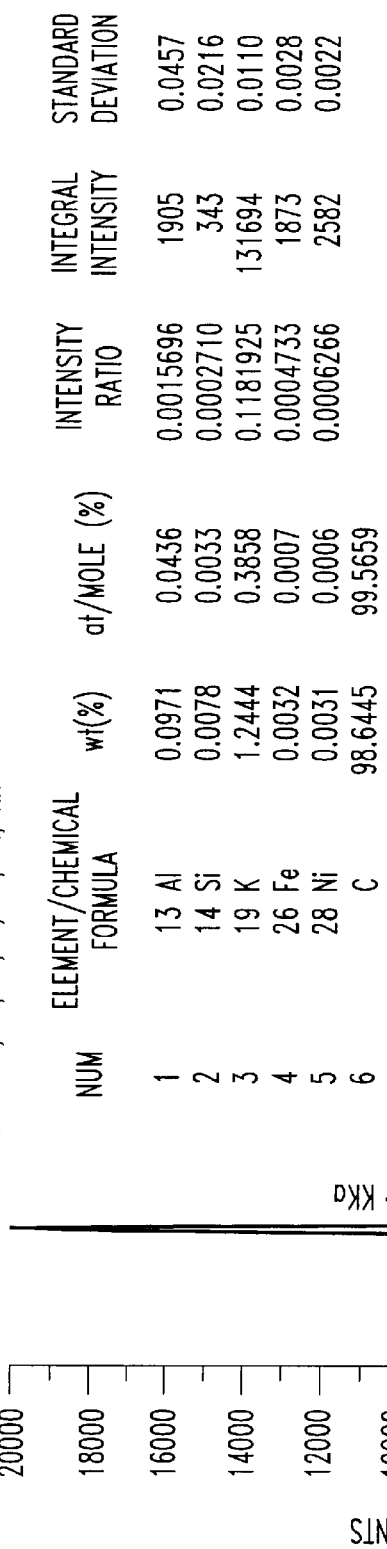
FIG. 3(b) is a fluorescent X-ray spectrum of a nonporous carbon [A752804+804HN] thermally post-treated within a stream of nitrogen-hydrogen mixture gas, showing the results of an X-ray fluorescence elemental analysis of the carbon.
Figure 3B:
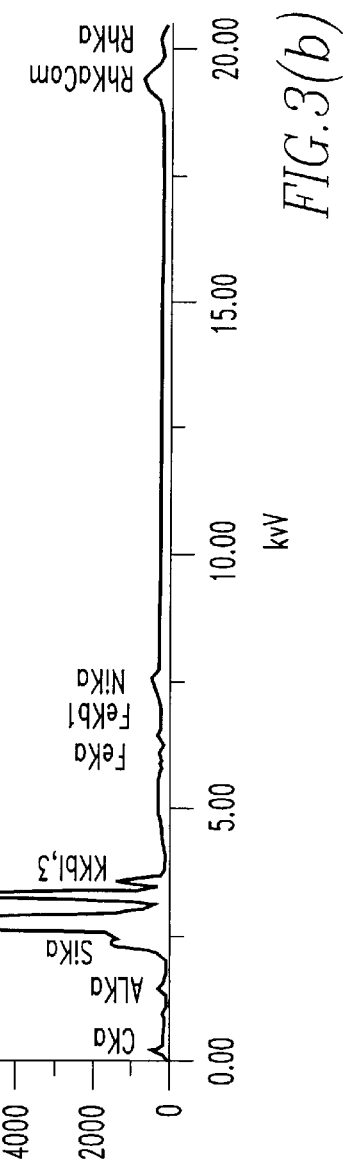

To demonstrate this, the alkali components of raw carbon treated with KOH were exhaustively removed using water vapor under pressure at 150° C. It was dried until the pH reached 7. Elemental analysis of the obtained carbon reveals that K of about 0.2 to 2% was detected. One example is shown in FIGS. 3(a) and 3(b). It is estimated that the remaining K exists as a compound such as a charge transfer complex directly bonded to carbon and forms some kind of solid electrolyte interphase (SEI) assisting ions to intercalate (E. Peled, *J Electrochem.* Soc., 126, 12(1979)).

FIG. 3(a) is a diagram showing the results of fluorescence X-ray elemental analyses of nonporous carbons. The diagram indicates a fluorescence X-ray spectrum of a nonporous carbon [A752802] obtained by preheating petroleum-based needle coke A at 750° C. for 2 hours, activating the coke at 800° C. for 2 hours using two parts of KOH, then washing the coke with water vapor at 150° C. until pH=7.0 was reached, and drying the coke. FIG. 3(b) indicates a fluorescence spectrum of a hydrogenated nonporous carbon [A752802+804HN] produced by thermally post-treating the above-described nonporous carbon at 800° C. for 4 hours within a nitrogen-hydrogen mixture gas stream. As can be seen from the diagram, the K content does not decrease even if a thermal treatment at 800° C. that is above the boiling point (758° C.) of metal potassium is performed. It is suggested that the potassium exists as a charge transfer complex chemically bonded to the carbon structure.

In the present invention, the nonporous carbon obtained as described above may also be further thermally treated at 500° C.–900° C. for 4 to 6 hours within a reducing atmosphere such as hydrogen gas or $3H_2+N_2$ mixture gas obtained by decomposing NH3 to remove hydrogen and oxygen atoms other than hydrogen atoms directly bonded to the carbon skeleton and to remove reactive sites that would normally react with oxygen and water in air by blocking them with hydrogen atoms. This carbon is referred to as hydrogenated nonporous carbon. Using this hydrogenated nonporous carbon, an electric double-layer capacitor having improved performance including improved breakdown voltage can be built.

As described later, an electrode was fabricated from the obtained nonporous carbon. The electrode was dried at 250° C. at $4\times10^{-5}$ Torr for 4 hours and evaluated by pulse NMR. This shows that chemically bonded, adsorbed water remains. Therefore, it is assumed that this chemically bonded, adsorbed water exists in forms of COOH, CHO, hydroquinone, etc. produced during the process after the alkali activation.

The specific surface areas of the obtained nonporous carbon and hydrogenated carbon were measured by the BET method using an instrument Sorptie 1750. Nitrogen was used as adsorbed gas. The heating furnace temperature was set to 110° C. The relative pressure range was 0.05 to 1.35. The measurement was carried by the BET one-point method. Some results are listed in Table 1. Samples B, D, and F use petroleum-based needle cokes. Sample E uses petroleum solidified pitch. Sample H is a porous activated carbon obtained by activating petroleum pitch, which has been solidified, with water vapor.

TABLE 1

|  | sample | specific surface area (m²/g) |
|---|---|---|
| nonporous carbon | B754802 | 50.0 |
|  | D754804 | 263 |
|  | E754804 | 233 |
| hydrogenated porous carbon | D754804 + 806H | 67.6 |
|  | F754804 + 806H | 82.2 |
| activated carbon (porous) | H | 1015 |

(2) Method of Fabrication of Polarized Electrodes (Carbon Electrodes)

Polarized electrodes can be fabricated by a method similar to the method used where the prior art activated carbon is employed. Where a sheetlike electrode is fabricated, for example, a nonporous carbon obtained by the aforementioned method is pulverized to approximately 5 to 100 μm, and the grain size is regulated. Then, a conductivity-promoting agent and a bonding agent are added. The conductivity-promoting agent imparts conductivity to powdered carbon and can be carbon black. The bonding agent can be polytetrafluoroethylene (PTFE). These materials are kneaded together and rolled into a sheet. Powdered graphite can be used as the conductivity-promoting agent, besides carbon black. PVDF, PE, PP, and so on can be used as the bonding agent, as well as PTFE. The compounding ratio of three components such as the nonporous carbon, the conductivity-promoting agent (carbon black), and the binding agent (PTFE) is generally approximately 10:(0.5–1):(0.25–0.5).

To fabricate an electrode, it is necessary that nonporous carbon particles and carbon black be uniformly distributed and that they are interspersed with PTFE fibers with substantially uniform strength. Therefore, the kneading operation needs to be carried out sufficiently. Generally, the rolling and stretching operation is required to be carried out vertically and horizontally and repeatedly. With respect to the obtained electrode density, the weight of the electrode in a dry state is measured, and the electrode density is calculated from the measured weight and from the apparent volume of the carbon electrode. Where the electrode density lies from 0.8 to 1.3 gm³, desirable capacitance and internal resistance are obtained. Nonporous carbons were prepared under various conditions, and 100 parts by weight of nonporous carbon, 5 parts by weight of carbon black, and 2.5 parts by weight of PTEF were mixed, kneaded together, and molded into a sheet-like form, thus producing electrodes. Electric double-layer capacitors were fabricated using these electrodes. With respect to these electric double-layer capacitors, the relation between the electrode density and the reached capacitance is given in Table 2.

TABLE 2

| sample name | electrode density (g/cm³) | reached capacitance |
|---|---|---|
| nonporous carbon or hydrogenated porous carbon |  |  |
| A754804 | 1.084 | 32–37 F/cc |
| A754804 + 654H | 1.022 |  |
| A754804 + 804H | 1.007 | 29–33 F/cc |
| B754804 | 1.169 | 39–41 F/cc |

TABLE 2-continued

| sample name | electrode density (g/cm³) | reached capacitance |
|---|---|---|
| B754804 + 654H | 1.049 |  |
| C754804 | 1.201 | 33–35 F/cc |
| C754804 + 654H | 1.051 |  |
| D754804 | 0.783 |  |
| D754804 + 654H | 0.839 | 29 F/cc |
| D754804 + 804H | 0.854 |  |
| E754804 | 0.962 |  |
| E754804 + 654H | 0.883 |  |
| F754804 + 804H | 0.923 | 29–32 F/cc |
| F754804 + 654H | 1.120 | 32 |
| activated carbon |  |  |
| H | 0.733 | ~17 F/cc |
| H + 804H | 0.893 | 15–17 F/cc |

The electrode density mainly arises from the density of the used nonporous carbon. Where the same nonporous carbon is used, if the electrode density is increased by a strong pressing operation, the holes through which the electrolyte solution can circulate will be clogged up. This will tend to increase the internal resistance greatly, making it difficult to use the electric double-layer capacitor.

Figure 4:
FIG. 4 is an electron micrograph of a nonporous carbon [C752802] in accordance with the invention, taken at 2,000,000x.
Figure 5:
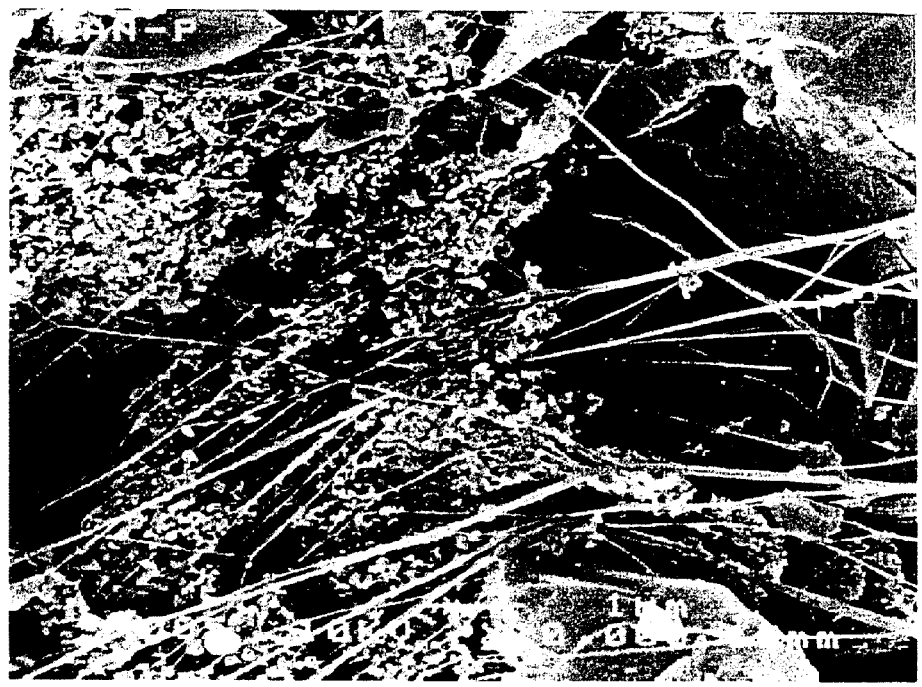
FIG. 5 is an electron micrograph (at 10,000x) of a polarized electrode (carbon electrode) fabricated using the nonporous carbon [C752802] in accordance with the invention.

Electron micrographs of obtained nonporous carbons and polarized electrodes of carbon are shown as examples in FIGS. 4 and 5. FIG. 4 is an electron micrograph (2,000,000x) of nonporous carbon [C752802] obtained by pretreating petroleum-based needle coke C at 750° C. for 2 hours and activating the coke with two parts of KOH at 800° C. for 2 hours. FIG. 5 is an electron micrograph (10,000x) of a polarized carbon electrode fabricated using this nonporous carbon [C752802].

It can be seen from FIG. 4 that the nonporous carbon in accordance with the present invention is partially crystallized and has almost no micropores. It can be observed from FIG. 5 that large shapes resembling broken stones are nonporous carbon in accordance with the invention. White dendrites are PTFE. Granules are carbon black. It can be understood that these three are interspersed well with each other.

As can be seen from the electron micrographs described above, the grain sizes of nonporous carbon in accordance with the present invention has a distribution from about 1 to 100 μm and is amorphous in shape like broken stones. The surface is covered with macropores (r>25 nm) and mesopores (1<r<25 nm). Substantially no micropores (r<1 nm) are present. That is, the nonporous carbon in accordance with the invention is carbon granules of indeterminate form of 1 to 100 μm, and has macropores and mesopores on its surface but no micropores. It can be understood, therefore, that the nonporous carbon in accordance with the invention is different from activated carbon and has a specific surface area of less than 270 m2/g, more preferably less than 100 m²/g.

That is, the nonporous carbon and hydrogenated nonporous carbon in accordance with the present invention are characterized in that they are free from micropores and have small specific surface areas. Where this is considered from the viewpoint of the difference with activated carbon, as the specific surface area of the nonporous carbon or hydrogenated nonporous carbon in accordance with the present invention decreases, electric double layers are not necessarily more likely to be formed within micropores. Rather, intercalation between carbon layers preferentially occurs, thus producing a capacitance. In this way, the feature of the electric double-layer capacitor in accordance with the present invention is utilized. Accordingly, the lower limit of the specific surface area of the nonporous carbon or hydrogenated nonporous carbon in accordance with the present invention is now discussed. If it is assumed based on the above-described feature that the nonporous carbon or hydrogenated nonporous carbon has no micropores at all and is a cube of 10 μm, the lower limit is theoretically estimated to be approximately 0.5 to 1 m²/g. However, the actual lower limit does not reach that value but assumes a value of about 50 m²/g.

Each carbon electrode is shaped into a desired sheet-like form. The carbon electrodes are stacked on top of each other via a separator to form positive and negative electrodes. Then, the electrodes are impregnated with an organic solvent containing an electrolyte, and an electric double-layer capacitor is assembled. A voltage higher than the rated voltage by 10 to 20% (usually, about 3.5–3.75 V) is applied to the assembled electric double-layer capacitor to charge it. Thus, an electric double-layer capacitor having a large capacitance is obtained. The structure of the electric double-layer capacitor derived as described thus far is schematically shown in FIG. 6.

Figure 6:
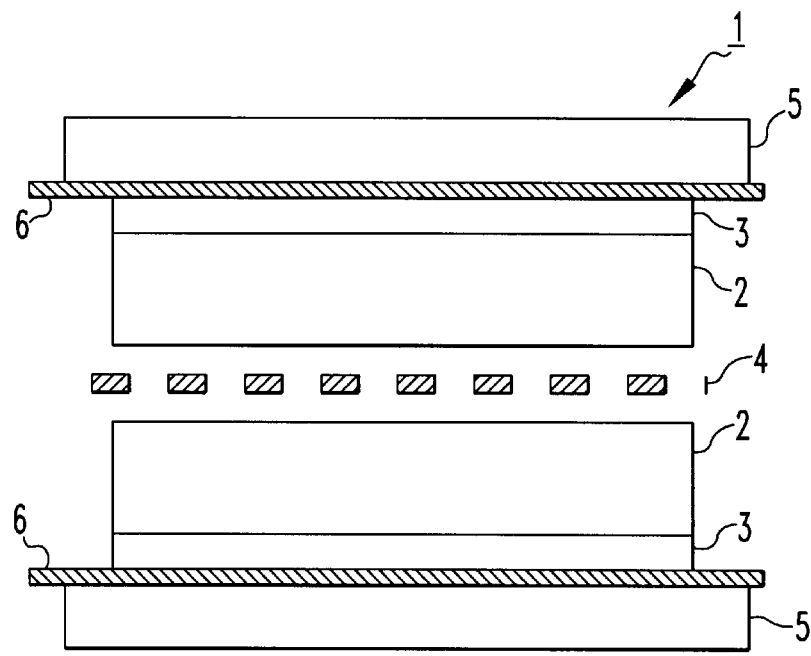
FIG. 6 is a schematic view of an electric double-layer capacitor, showing its structure.

Referring to FIG. 6, an electric double-layer capacitor in accordance with the present invention is indicated by numeral 1. A current collector 3 is mounted to each polarized electrode 2 made of a nonporous carbon. These electrodes are mounted as positive and negative electrodes, respectively, such that they are located opposite to each other via a separator 4. The electrodes are immersed in a liquid electrolyte within a container 6 sealed with the electrolyte. External electrodes (not shown) such as leads are attached to the current collectors. The electric double-layer capacitor 1 is charged and discharged via these external electrodes. A volume-limiting means 5 consists, for example, of a pressure plate for suppressing expansion of the volume in the direction of the electric field.

Evaluation of the characteristics of the electric double-layer capacitor in accordance with the present invention as described above and the mechanism of generation of a capacitance are next described. A sample for testing was prepared and its characteristics were evaluated. Specifically, polarized electrodes fabricated using the nonporous carbon in accordance with the invention were used as positive and negative electrodes, respectively. $Et_4N \cdot BF_4$ was dissolved at a concentration of about 1 molyliter into a mixture solvent. The mixture solvent was prepared by adding equal volumes of acetonitrile (ACN) and propylene carbonate (PC) or ethylene carbonate (EC). The obtained electrolyte solution was vacuum impregnated into the polarized electrodes. Current collectors were fabricated from aluminum foil. These components were vacuum packed in a high humidity-barrier laminate polyethylene film bag via a GA-100 glass fiber separator.

Then, with respect to each fabricated sample (electric double-layer capacitor) for testing, the volume was restricted in the direction of the electric field. The produced pressure was measured with a pressure-monitoring jig (see Japanese patent laid-open No. 317333/1999).

The following two methods were used to examine the relation between the applied voltage and the produced capacitance. In one method, a normal charging-and-discharging test is carried out. The capacitor is charged with a constant current. As electric charge is stored in the capacitor, the voltage increases. This increase in voltage is monitored. That is, the capacitor is charged with a constant current, and the voltage is maintained after a preset voltage is reached. This establishes a constant voltage-charging mode. Then, the current decreases, which is referred to as relaxation charging. When a preset time has passed, the constant-current mode is resumed. The capacitor is discharged, and the stored electric charge decreases, reducing the voltage. When discharging is done until the voltage reaches 0 V, charging is restarted after a given pause. Some of the results of the measurements described above are shown in FIGS. 7, 8, and 9.

Figure 7:
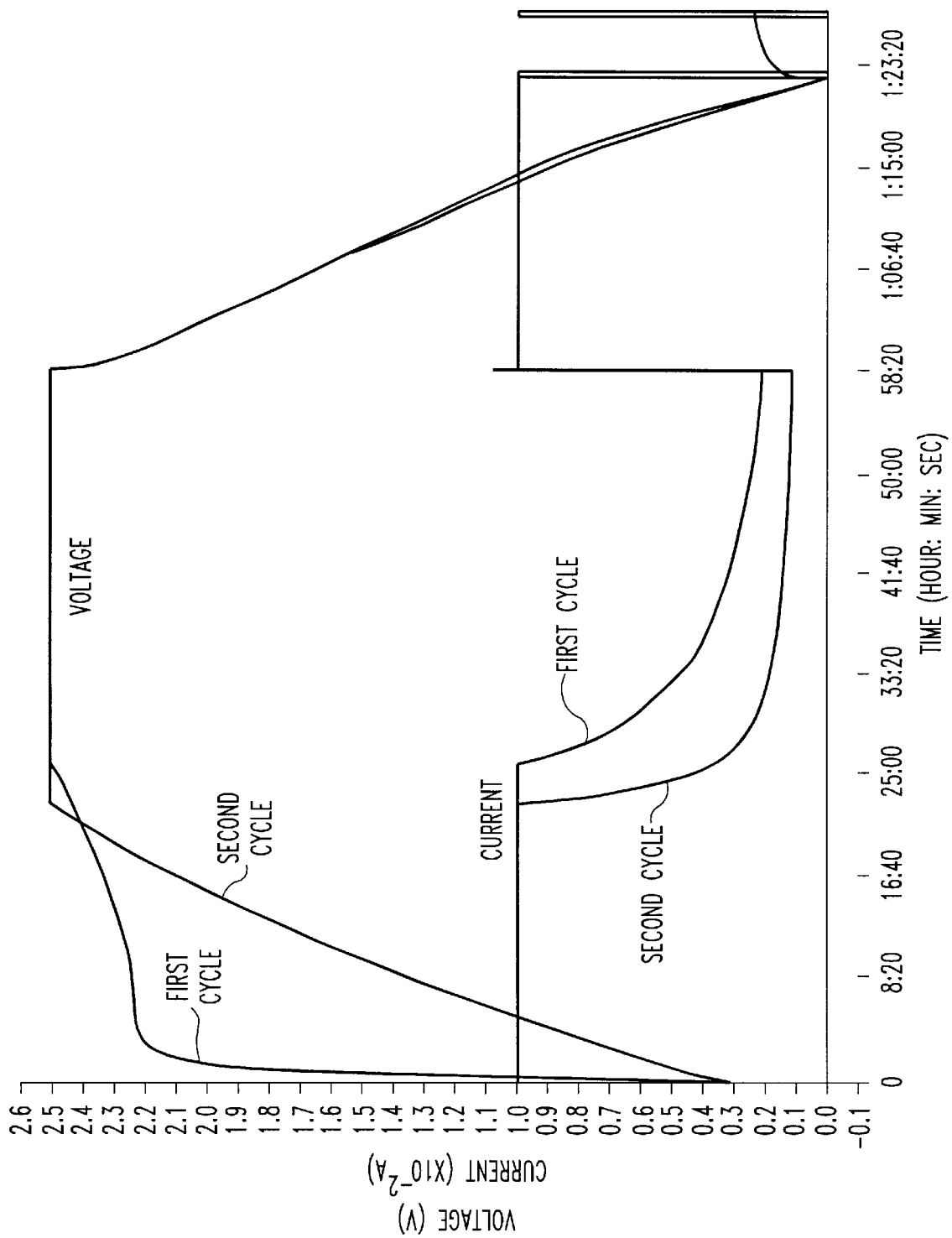
FIG. 7 is a graph showing the results of charging and discharging tests (first and second cycles) on an electric double-layer capacitor fabricated using a nonporous carbon [B754804] in accordance with the invention.

Petroleum-based needle coke B was calcined at 750° C. for 4 hours. This calcined carbon was treated with two parts of KOH at 800° C. for 4 hours. The mixture was washed with heated water vapor until the pH reached 7. The mixture was heated and vacuum dried, thus producing nonporous carbon [B754804]. Electrodes were fabricated using this carbon. As an electrolyte solution, 1 mol/liter solution of propylene carbonate of $Et_4N \cdot BF_4$ was used. The results are shown in FIG. 7, where only the first cycle (initial charging) in which the voltage was set to 2.5 V and the second cycle are shown. It can be seen from FIG. 7 that the voltage rises in a short time during the initial charging. The voltage rise becomes milder rapidly around 2.25 V. However, in the second cycle, the voltage increased monotonously quite similarly to the case of ordinary activated carbon electrodes.

The petroleum-based needle coke B was calcined 750° C. for 4 hours. The obtained calcined carbon was treated with two parts of KOH at 800° C. for 2 hours. The mixture was washed with heated water vapor until the pH reached 7. The mixture was heated and vacuum dried, thus producing nonporous carbon [B754802]. Electrodes were fabricated from this carbon. $Et_4N \cdot BF_4$ was dissolved at a concentration of about 1 mol/liter into a mixture solvent to produce an electrolyte solution. The mixture solvent was prepared by adding equal volumes of acetonitrile (ACN) and propylene carbonate (PC). In the initial charging (first cycle), the voltage was set to 3.75 V. The results are shown in FIG. 8.

Petroleum-based needle coke D was calcined at 750° C. for 4 hours. The obtained calcined carbon was treated with two parts of KOH at 800° C. for 6 hours. The mixture was washed with heated water vapor until the pH reached 7. The mixture was heated and vacuum dried, thus producing nonporous carbon. The carbon was thermally post-treated at 800° C. for 6 hours within a stream of hydrogen to produce hydrogenated porous carbon [D754806+806H]. Electrodes were fabricated from this carbon. $Et_4N \cdot BF_4$ was dissolved at a concentration of about 1 mol/liter into a mixture solvent to produce an electrolyte solution. The mixture solvent was prepared by adding equal volumes of ethylene carbonate and diethyl carbonate. In the initial charging (first cycle), the voltage was set to 3.75 V. The results are shown in FIG. 9.

Figure 8:
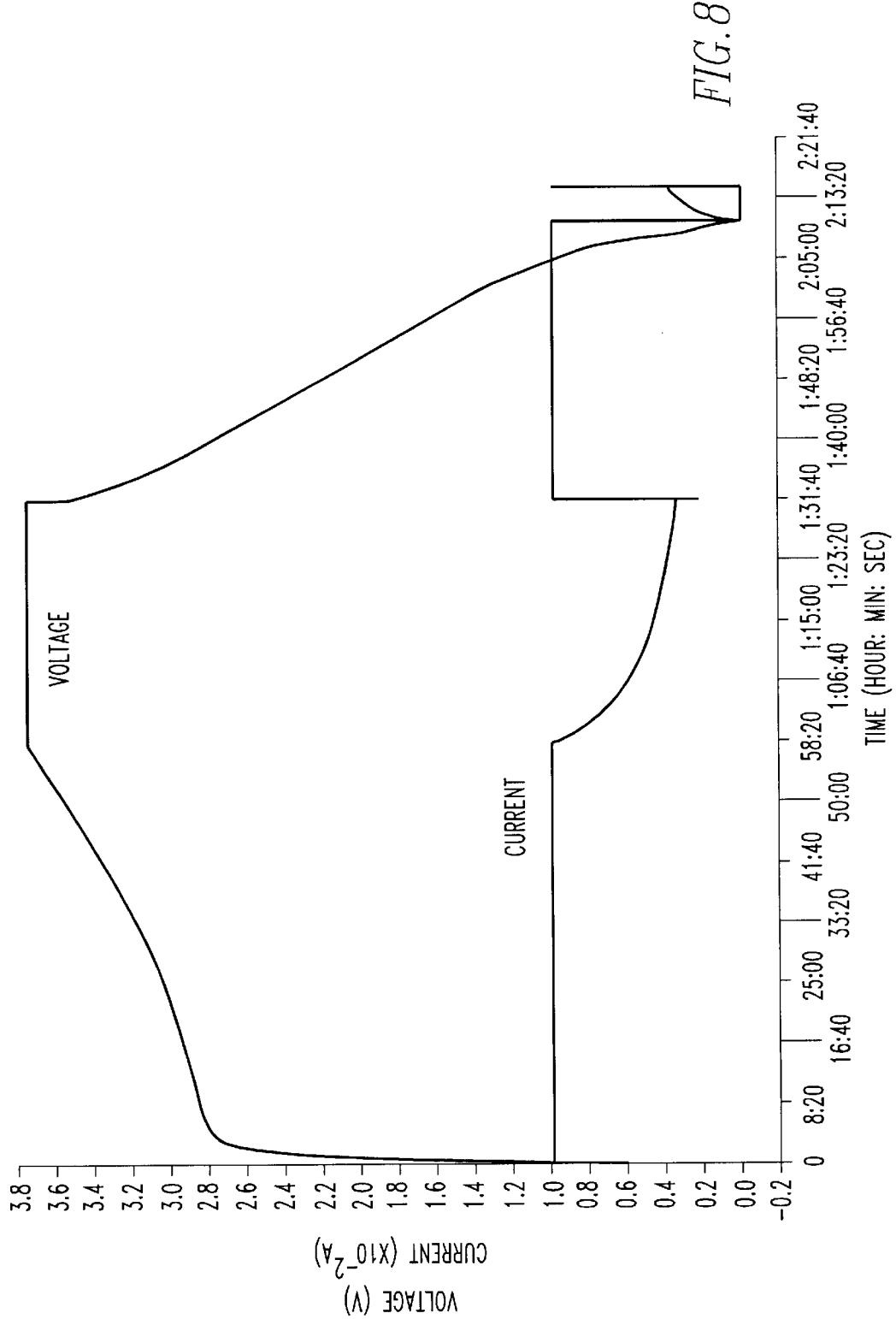
FIG. 8 is a graph showing the results of charging and discharging tests (first cycle) on an electric double-layer capacitor fabricated using a nonporous carbon [B754802] in accordance with the invention.
Figure 9:
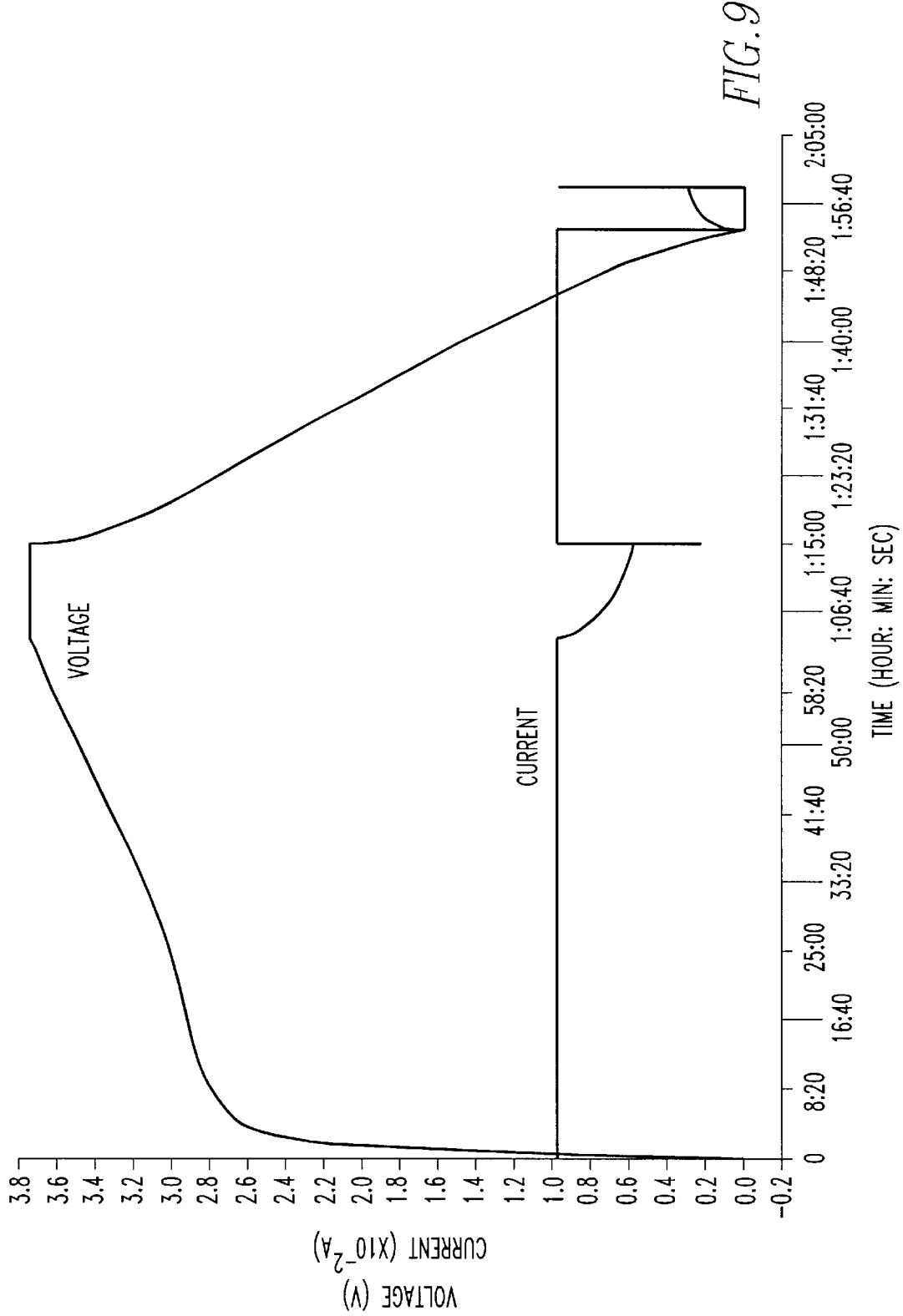
FIG. 9 is a graph showing the results of charging and discharging tests (first cycle) on an electric double-layer capacitor fabricated using a nonporous carbon [D754806+806H] in accordance with the invention.

It can be seen from FIGS. 8 and 9 that in any case, the voltage rises in a short time during initial charging. The voltage rise becomes milder around 2.8 V. In this way, results similar to those obtained in the case of FIG. 7 can be obtained. The voltage at which the voltage rise becomes milder differs somewhat between the cases shown in FIGS. 8 and 9, respectively. That is, the voltage is 2.8 V in FIG. 8, whereas the voltage is 2.7 V in FIG. 9. This difference is due to the difference of the voltage at which intercalation is started as described later.

The relation between the applied voltage and the capacitance and the relation between the applied voltage and the expansion pressure were examined by the following method. During measurement, the voltage between the electrodes was increased up to 4.0 (in some cases, up to 3.75 V) in increments of 0.5 V. At the same time, the interval at which the mode of operation was switched between charging and discharging were increased in increments of 500 seconds.

After the maximum voltage was reached, the voltage and the interval were similarly incrementally reduced during measurement. Furthermore, variations in expansion pressure occurring with varying the voltage in increments were recorded. Some of the results of the measurements are shown in FIGS. 10(a) and 10(b).

Petroleum-based needle coke A was calcined at 750° C. for 4 hours. The obtained calcined carbon was treated with two parts of KOH at 800° C. for 2 hours. The mixture was washed with heated water vapor until the pH reached 7. The mixture was heated and vacuum dried, thus producing nonporous carbon [A754802]. Electrodes were fabricated from this carbon. $Et_4N \cdot BF_4$ was dissolved at a concentration of about 1 mol/liter into a mixture solvent to produce an electrolyte solution. The mixture solvent was prepared by adding equal volumes of ethylene carbonate and acetonitrile. The results are shown in FIG. 10. Measurements were performed similarly to measurements illustrated in connection with FIG. 7. In this case, the diameter of the electrodes was 2 cm and so the area of each electrode was $\pi cm^2$. At a setting of 10 mA, it follows that a measurement is made at a current density of $10/\pi m/cm^2$.

The capacitance is calculated using $Q=\frac{1}{2} CV^2$ and a value that is 50% of the total discharge current from the beginning of discharging. In FIG. 10(a), the inter-electrode voltage is plotted on the horizontal axis, while the capacitance is converted into a value per unit volume of each of the positive and negative electrodes in a dry state and plotted on the vertical axis. The solid line indicates a case where electrodes of the nonporous carbon [A754802] in accordance with the present invention are used. The broken line indicates a reference case. Petroleum-based solidified pitch was activated by water vapor to obtain activated carbon [H]. Electrodes were fabricated from this activated carbon. As a liquid electrolyte, 1 mol/liter solution of propylene carbonate of $Et_4N \cdot BF_4$ was used, and measurements were made. In FIG. 10(b), the expansion pressure is given in Kg · f on the same horizontal axis for the case of electrodes of nonporous carbon [A754802]. In order to convert a value per unit area, the value may be divided by $\pi cm^2$. In cases of electrodes using activated carbon, no pressure variations occurred at all.

Figure 10A:
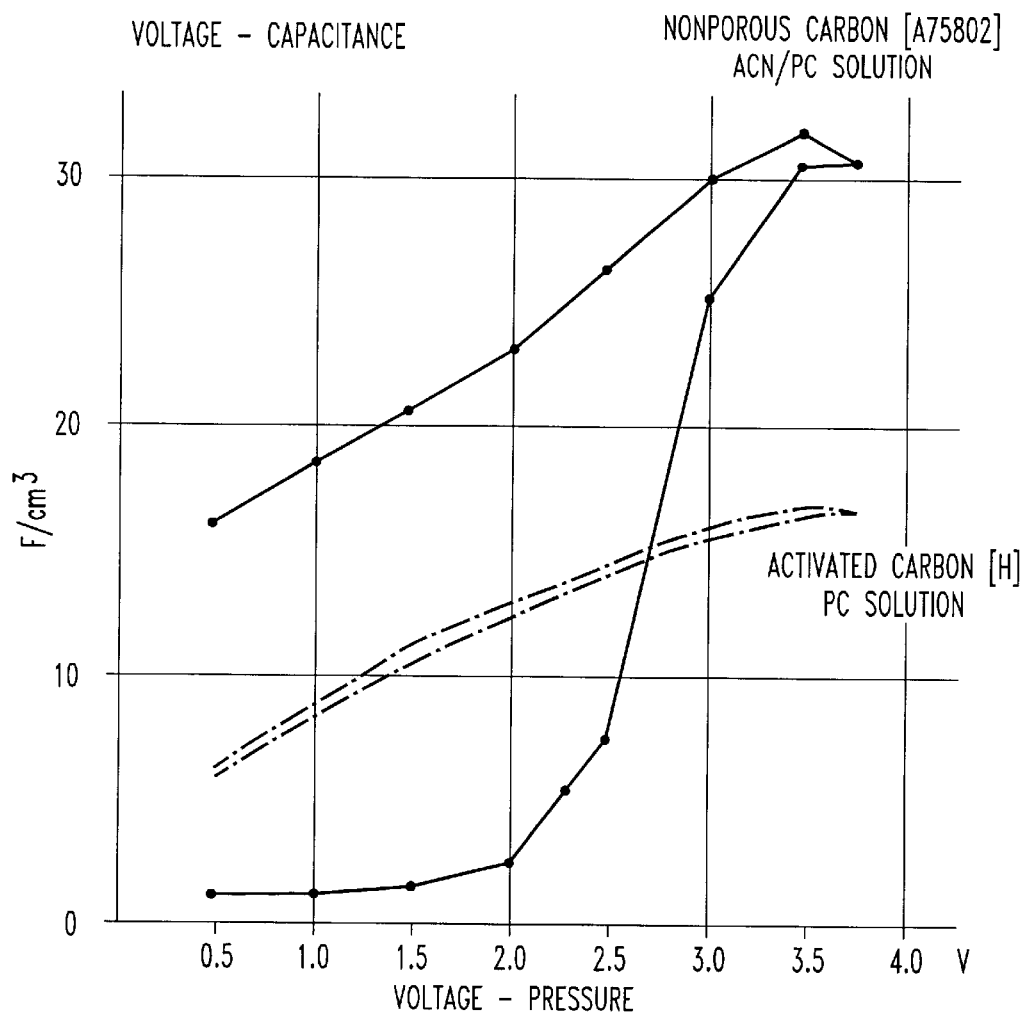
FIG. 10(a) is a graph showing the relation between a charging voltage and capacitance characteristics, and in which the solid line indicates a case in which the nonporous carbon [A754802] is used and a solvent prepared by mixing propylene and acetonitrile in a 1:1 ratio in volume is used, and the broken line indicates the results of a case in which electrodes are fabricated from activated carbon [H] and propylene carbonate is used as a solvent.
Figure 10B:
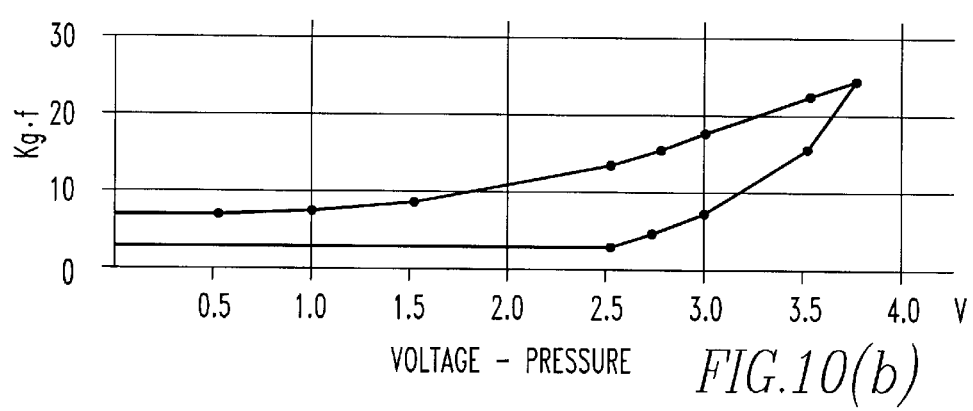
FIG. 10(b) is a graph showing the relation between the charging voltage and the expansion pressure.

It can be seen from FIGS. 10(a) and 10(b) that the electric double-layer capacitor in accordance with the present invention shows a conspicuous hysteresis effect. On the other hand, the capacitor using electrodes of activated carbon shows no hysteresis effect. Comparison of FIG. 10(a) with FIG. 10(b) reveals that the pressure increases in step with the capacitance. Hence, it can be seen that a hysteresis effect is produced in pressure variations, as well as in capacitance.

As mentioned previously, charging and discharging voltages and the capacitance were measured. The capacitance was converted into an energy. The internal resistance was found from the average value of the voltage drop characteristics. Both are indicated on a semi-logarithmic scale in FIG. 11, where the arrows indicate the order in which measurements were made.

Figure 11:
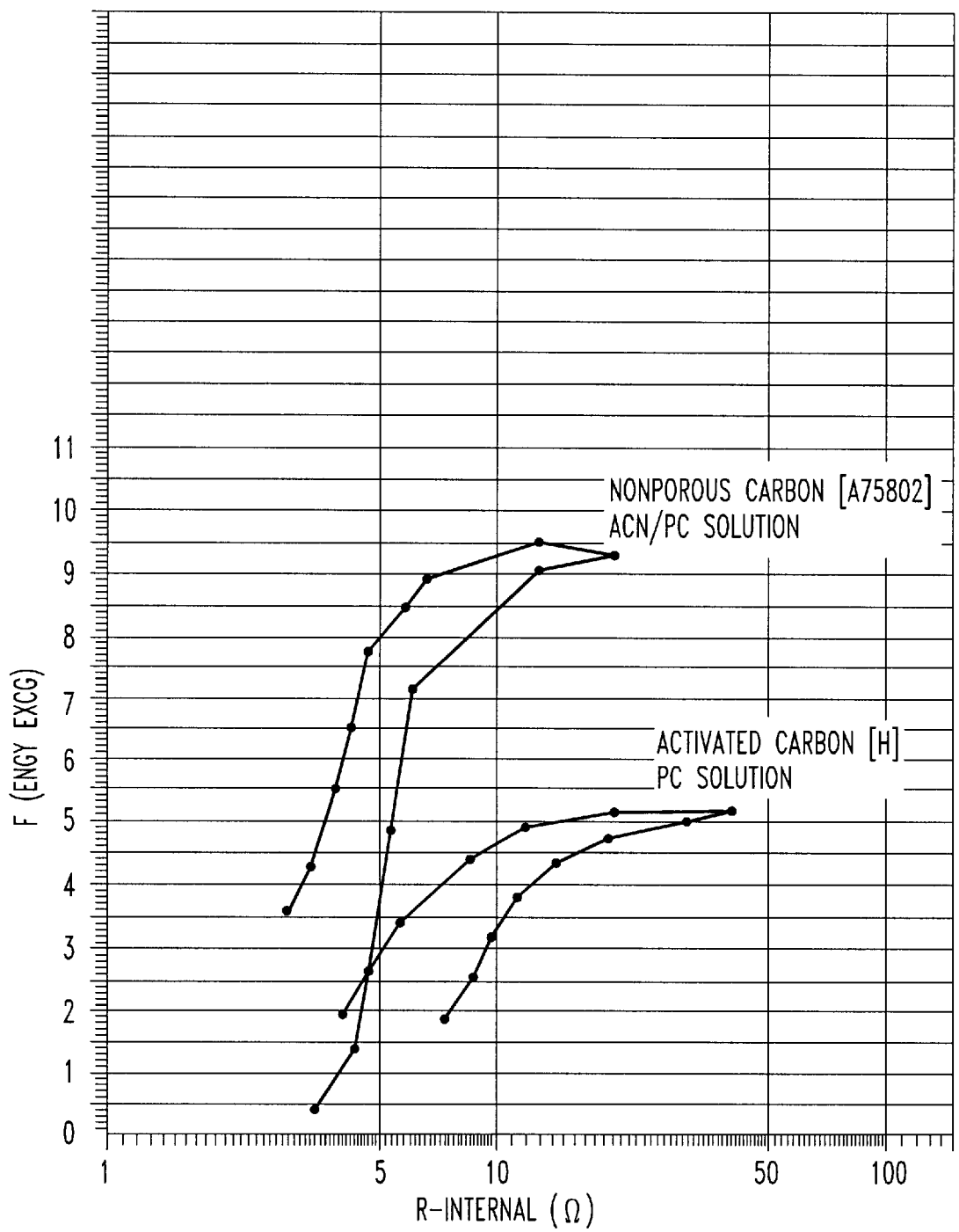
FIG. 11 is a graph showing the relation between capacitance converted into energy and internal resistance value where the nonporous carbon [A754802] and the solvent prepared by mixing propylene and acetonitrile in a 1:1 ratio in volume are used and in which the arrows indicate the order in which measurements were made, and is a graph showing the results obtained where electrodes are fabricated from activated carbon [H] and propylene carbonate is used as a solvent.

It can be seen from FIG. 11 that for a constant value (e.g., 10 Ω) of the internal resistance, the capacitance of the capacitor using nonporous carbon electrodes is twice as large as the capacitance of the capacitor using activated carbon electrodes. To obtain the same capacitance as the capacitance of the capacitor using the activated carbon electrodes, the internal resistance can be one fifth or less of the internal resistance of the latter, or prior art, capacitor.

These characteristics can be understood as follows. The electric double-layer capacitor in accordance with the present invention uses acetonitrile with a small molecular volume as a solvent. Also, the capacitor contains a large amount of carbon showing high electrical conductivity per unit volume. On the other hand, in the case of the activated carbon, it contains a large number of voids showing low electrical conductivity. If propylene carbonate having a large molecular volume were used, and if a capacitor were built using a nonporous carbon, then a large internal resistance would be obtained, thus reversing the relation of performance with the capacitor using activated carbon electrodes. This can be explained as follows. Although the carbon itself has a high electrical conductivity, electrolyte ions cannot easily go into and out of the carbon structure, lowering the ionic conductivity. As a result, the internal resistance increases.

Figure 12:
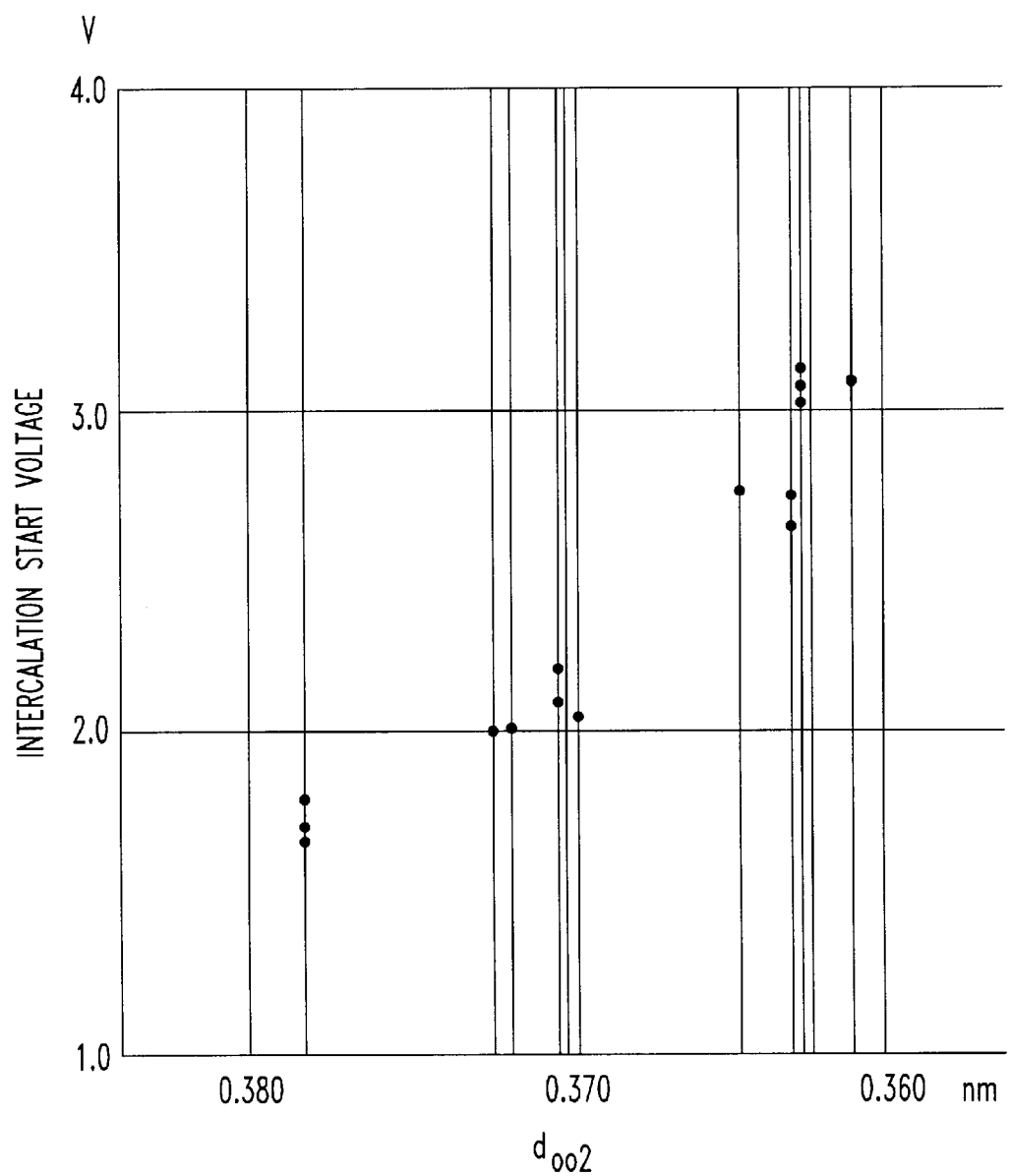
FIG. 12 is a graph showing the relation between the interplanar spacing $d_{002}$ of nonporous carbon that may or may not be hydrogenated and the threshold value (Vc) of a voltage at which capacitance is started to be produced by intercalation.
Figure 13:
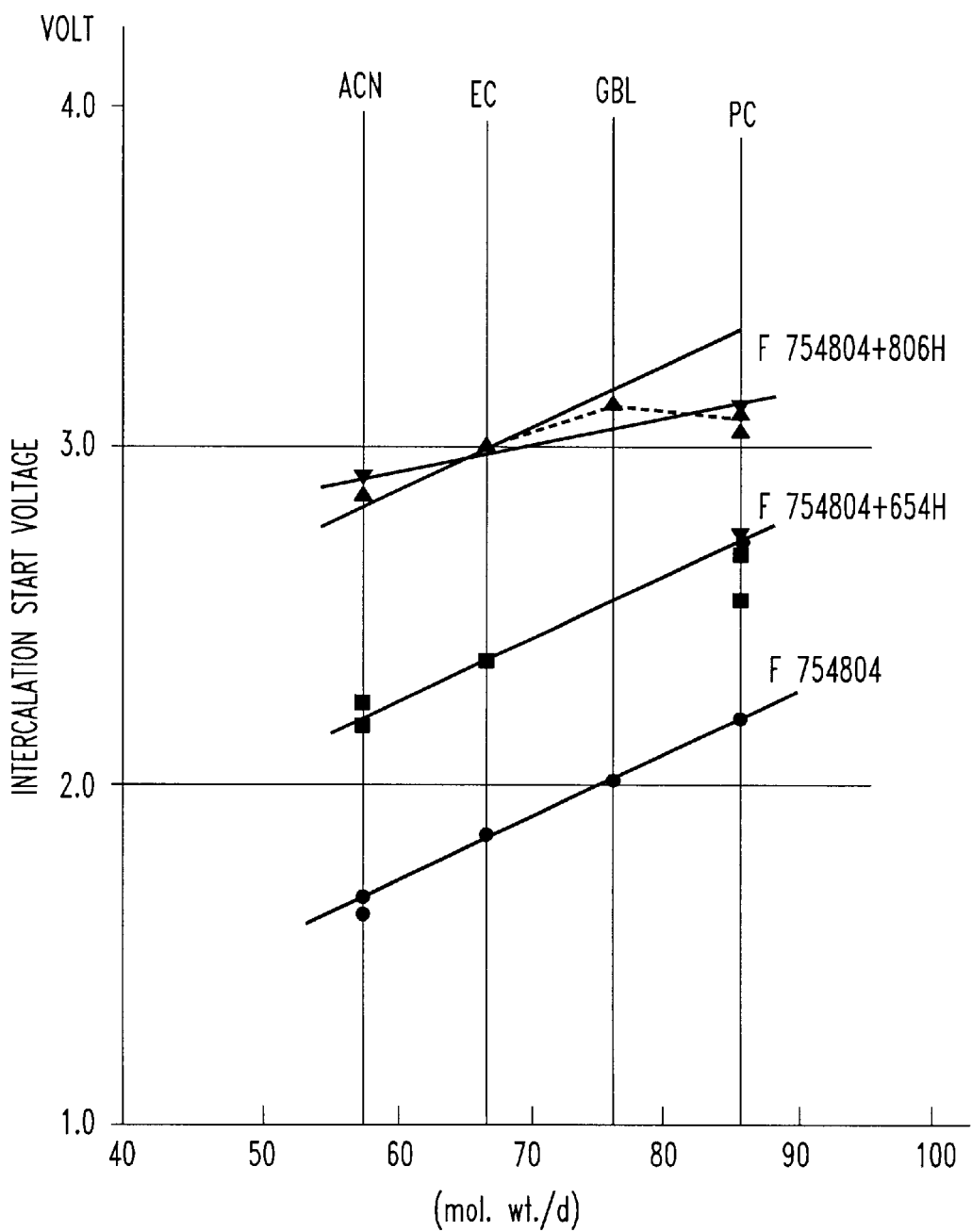
FIG. 13 is a graph showing the relation between the molecular volume of each solvent and the threshold value (Vc) of a voltage at which capacitance is started to be produced by intercalation.

The degree of ease with which electrolyte ions are intercalated and deintercalated into and from graphite-like layers together with a solvent is illustrated in FIGS. 12 and 13. Petroleum-based needle cokes A, B, and C were activated under various conditions at 800° C.–900° C. for 2 to 4 hours. Some of the obtained nonporous carbons were thermally post-treated under various conditions within hydrogen or hydrogen-nitrogen mixture gas at 500° C.–900° C. for 4 to 6 hours. The interplanar spacings $d_{002}$ of the resulting nonporous carbons and hydrogenated nonporous carbons were measured by XRD measurements. Also, electric double-layer capacitors were fabricated using them. The voltage at which intercalation started in each capacitor was measured. The results are shown in FIG. 12. The electrolyte is 1 mol/liter propylene carbonate solution of $Et_4N \cdot BF_4$. As can be seen from FIG. 12, intercalation starts at a higher voltage with decreasing the interplanar spacing $d_{002}$.

In FIG. 13, molecular volume (molecular weight/specific weight) of solvent is plotted on the horizontal axis to indicate the voltage at which intercalation starts in electric double-layer capacitors using nonporous carbons or hydrogenated nonporous carbons in accordance with the invention. As an example, petroleum-based needle coke F was thermally pretreated at 750° C. for 4 hours, and then it was alkali activated together with two parts of KOH at 800° C. for 4 hours, thus producing nonporous carbon [F754804]. This nonporous carbon was thermally post-treated at 650° C. within a stream of hydrogen for 4 hours, resulting in hydrogenated porous carbon [F754804+654H]. The nonporous carbon [F754804] was also thermally post-treated at 800° C. for 2 hours within a stream of hydrogen, giving rise to hydrogenated nonporous carbon [F754804+802H]. One mol/liter of $Et_4N \cdot BF_4$ was dissolved in various solvents including acetonitrile (ACN), a solvent prepared by mixing equal volumes of ethylene carbonate and diethyl carbonate, γ-butyl lactone (GBL), and propylene carbonate (PC). Measurements were made using the obtained solvents. The results are shown in FIG. 13.

The results indicate that the voltage at which intercalation starts is proportional to the molecular volume of solvent molecules for the same electrode (i.e., for the same interplanar spacing) and for the same electrolyte ion, though the measured values differ slightly. It is to be noted that in cases of mixture solvents, the solvent of smaller molecular volume is prevalent. As can be seen from the example of mixture of equal volumes of ethylene carbonate (EC) having a molecular volume of 68.7 and diethyl carbonate (DEC) having a molecular volume of 121.2, plotting of the values of the molecular volume of ethylene carbonate forms a straight line. Other mixture solvents, i.e., acetonitrile/ethylene carbonate and acetonitrile/propylene carbonate, were used and experiments were performed. The obtained values are coincident with the value derived from acetonitrile having a smaller molecular volume.

It can be concluded from the foregoing that a solvent having a small molecular volume has a low viscosity and contributes to enhancement of ion mobility and therefore reduces the Werburg impedance and contributes to fast charging/discharging.

Electrodes were fabricated using the same nonporous carbon. Propylene carbonate and acetonitrile were used as solvents. Using them, electric double-layer capacitors were assembled. The capacitors were charged and discharged with a constant current of 4.7 mA/cm$^2$ up to 3.5 and up to 3.0 V. At this time, the effects of the internal resistance of each capacitor are illustrated in FIGS. 14(a), 14(b), 14(c) and 14(d) where voltage and time are plotted on the vertical and horizontal axes, respectively. It can be seen from the measurement curves that the voltage drop ($\Delta$Vd) occurs when a transition is made to discharging after the end of charging and that the internal resistance increases with increasing the voltage drop.

Figure 14C:
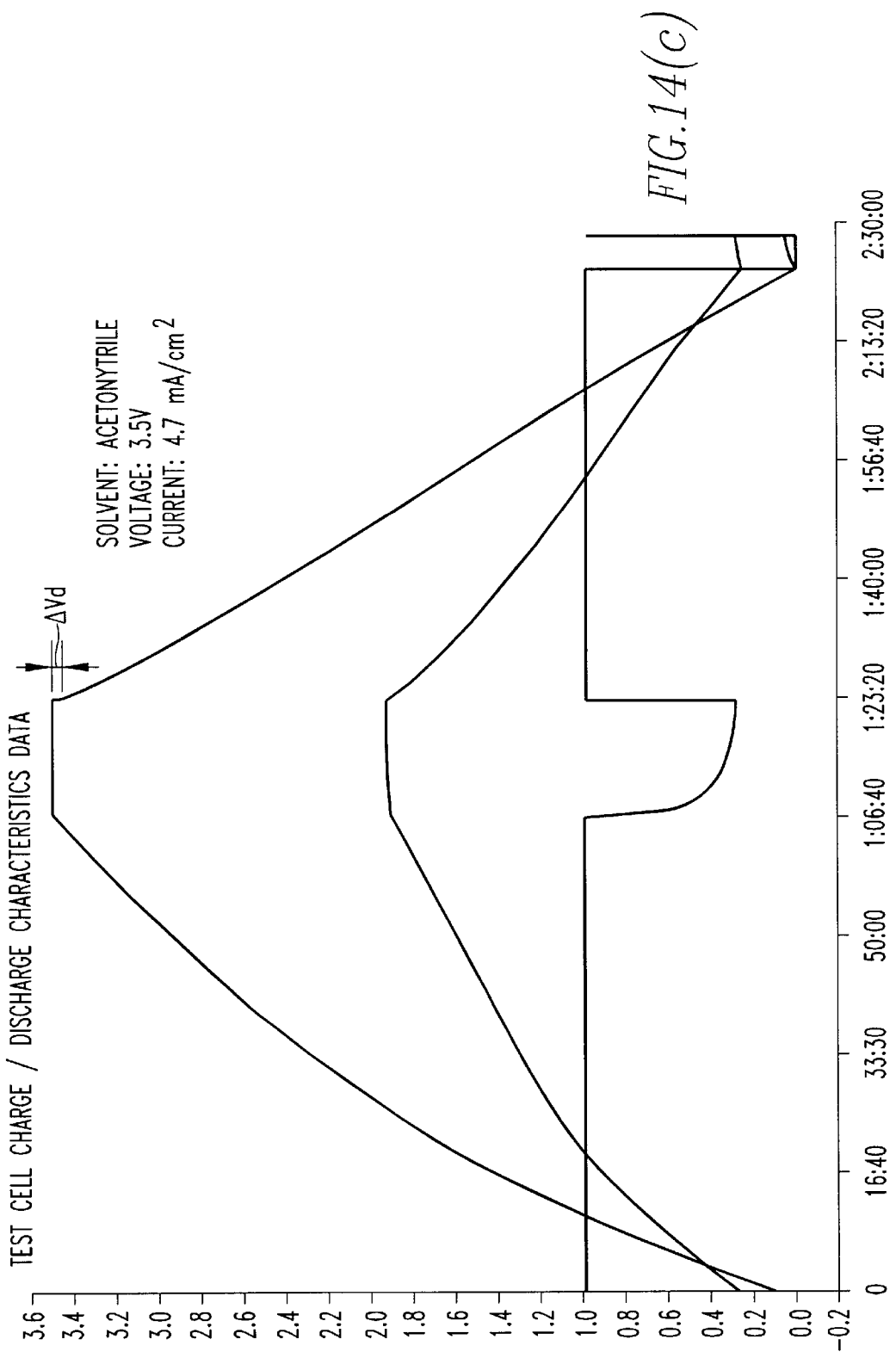

FIGS. 14(a) and 14(b) indicate cases in which propylene carbonate is used as a solvent. FIGS. 14(c) and 14(d) indicate cases in which acetonitrile is used as a solvent. In any case in which the same voltage is applied, where propylene carbonate is used (FIGS. 14(a) and 14(b)), larger voltage drops occur. Where acetonitrile is used (FIG. 14(c) and FIG. 14(d)), voltage drops decrease because of a smaller internal resistance. To fabricate the used carbon electrodes, petroleum-based needle coke A was thermally pretreated at 750° C. for 4 hours. The coke was activated with 2 parts of KOH at 800° C. for 4 hours, producing nonporous carbon [A754804]. Using this carbon, the used carbon electrodes were fabricated. The electrolyte was Et4N • BF$_4$ (1 mol/liter).

Polarized electrodes were fabricated using the aforementioned nonporous carbon and dried at 250° C. and at 5×10$^{-5}$ Torr for 4 hours, thus manufacturing electric double-layer capacitors. The capacitors were used at 3.5 V repeatedly. Sometimes, generation of gas, attenuation of the capacitance, and rise of the internal resistance were observed. These phenomena were observed more frequently than where electrodes of good quality carbon are repeatedly used at a lower voltage of 2.5 V. Accordingly, we discuss the cause.

When $^1$H NMR measurement of nonporous carbons in powder state is performed by a pulse NMR instrument, a decay signal in which two or three different components with different relaxation times are superimposed is often observed, though the nonporous carbons were treated by heating and vacuum drying under the conditions described above. One is a short component having a transverse short relaxation time T$_2$ of 18 to 40 $\mu$sec, and can be approximated by a resonance line of Gaussian distribution. This component does not change even if the carbon is sintered at 800° C., and the component is assigned to hydrogen directly bonded to carbon. As a second component, there is a middle relaxation time component having T$_2$ of 100 to 400 $\mu$sec of Lorentzian distribution. It is difficult to remove this component by heating and vacuum drying conducted under the above-described conditions. This corresponds to chemically adsorbed water and is attributed to functional groups made up of oxygen and hydrogen such as COOH, CHO, and hydroquinone. A component having a still longer relaxation time T$_2$=500 to 2000 $\mu$sec is also observed, but this is mostly removed by the above-described heating and vacuum drying. In some cases, the moderate relaxation time component may be classified into two components of different characteristics.

Chemically adsorbed water will be a hindrance in operating the capacitor at higher than 2.7 V, as well as physically adsorbed water. Since many conventional activated carbon electrodes are used while leaving a part of chemically adsorbed water, it is customary to limit the operating voltage to about 2.5 V.

This is demonstrated by the following fact. Very well dried activated carbon was put into an NMR sample tube fitted with a vacuum valve. Using a microsyringe, 1 $\mu$l of water per gram of activated carbon was intentionally added. The cock was tightened. The tube was warmed to vaporize the water. After the carbon was allowed to stand for a sufficient length of time, $^1$H NMR measurement was performed by pulse NMR. Long relaxation time component attributed to physically adsorbed water was not observed. Only moderate relaxation time components attributable to chemically adsorbed water increased. The rate of increase was exactly in proportion to the added amount of water.

This means that if the amount of water remaining in the electrolyte solution or the amount of water adsorbed during the work is small, the water is chemically adsorbed onto reactive sites of activated carbon and does not exist as free water such as physically adsorbed water and thus does not produce large effects at 2.5 V or lower. However, where a voltage of 2.7 V or 3.0 V or higher is applied, functional groups formed by the chemically adsorbed water react with the electrolyte solution. As a result, gas is given off, the internal resistance increases, and the capacitance decreases.

It has been proposed to thermally treat activated carbon at 650° C.–900° C. to improve the withstand voltage of electrodes of activated carbon or to improve the cycle use characteristics. Although thermal treatment assures improvement of the withstand voltage performance, the capacitance is deteriorated (M. Kikuchi et. al., *J Electroanalytical Chemistry*, Vol. 396 (1995), pp. 451–455).

In summary, activated carbon has a large specific surface area and so the amount of remaining functional group is also large. Therefore, it is not easy to remove hydrogen from the functional groups. If a voltage of higher than 2.5 V is applied, the internal resistance increases, resulting in a decrease in the capacitance. On the other hand, where the novel carbon having a quite small surface area is used to fabricate polarized electrodes, the number of existing functional groups is quite small. Therefore, if the capacitor is used at a voltage higher than 3.0 V, the capacitance never decreases but can increase.

That is, a carbon having a small surface area (in other words, carbon having no pores at all) can be used as the material of an electric double-layer capacitor. The present invention is intended for this nonporous carbon.

The remaining functional groups containing oxygen and hydrogen are removed by thermally post-treating a carbon having an interplanar spacing d$_{002}$ of 0.360 to 0.380 nm at 650° C.–800° C. within a reducing atmosphere (e.g., within a stream of nitrogen-hydrogen mixture or within a stream of hydrogen) by the method described previously.

Where this thermal post-treatment is made within a stream of nitrogen or in vacuum, the functional groups of oxygen and hydrogen are once removed. However, active free radicals remain on the surface of the carbon or electrons (so-called unpaired electrons) captured in the orbit are left in the conjugate-i orbit of benzene ring meshy structure.

Where the carbon material is taken into the air and allowed to stand, these unpaired electrodes quickly react with oxygen and water (water vapor), again forming functional groups containing oxygen and hydrogen atoms such as COOH and CHO. Consequently, the functional groups containing oxygen and hydrogen atoms are not removed. To confirm this, the relation of the sintering temperature of carbon to the intensity of the resulting electron spin resonance signal was examined. A curve indicating the intensity of the electron spin resonance signal shows an increasing tendency and has a peak at 950° C. This means that as the sintering temperature is elevated, more active free radicals and captured electrons (unpaired electrons) are produced. Where the sintered carbon was allowed to stand in air, the intensity of the electron spin resonance signal of positive free radicals decreased. This also assures the validity of the above-described conclusion.

In particular, where carbon is thermally treated within a hydrogen-nitrogen mixture stream as mentioned previously, the reactive sites within the carbon are terminated or blocked off with $^1$H. This prevents the carbon from being converted by COOH or CHO due to oxygen or water in air. In fact, observation of the carbon treated as described above by pulse NMR reveals that the short relaxation time component (i.e., hydrogen atoms directly bonded to the carbon) increases conspicuously and that the moderate relaxation time component decreases conspicuously. The ratio of the existing moderate relaxation time component to the short relaxation time component is less than one third, preferably less than one fifth.

It can be understood from the foregoing that with respect to the hydrogenated nonporous carbon obtained by thermal post-treatment, hydrogen and oxygen atoms other than hydrogen atoms directly bonded to the carbon skeleton are removed. The reactive sites of the carbon which would normally react with oxygen and water in air have been replaced with hydrogen atoms and blocked off. The reactive sites of the nonporous carbon are present on the prism surface, not on the base surface (Yuzoh Sanada et. al., "Foundations and Applications of Activated Carbon", New Edition, Kohdansha Scientific, 1994).

To find these relaxation time components, the following procedures are carried out using pulse NMR.

1) Preparation of Sample

Figure 15:
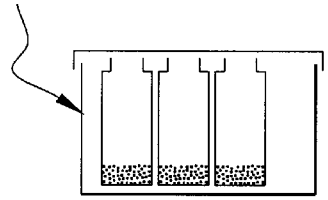
FIG. 15 is a schematic view illustrating preparation of a specimen for pulse NMR measurements.
Figure 15:
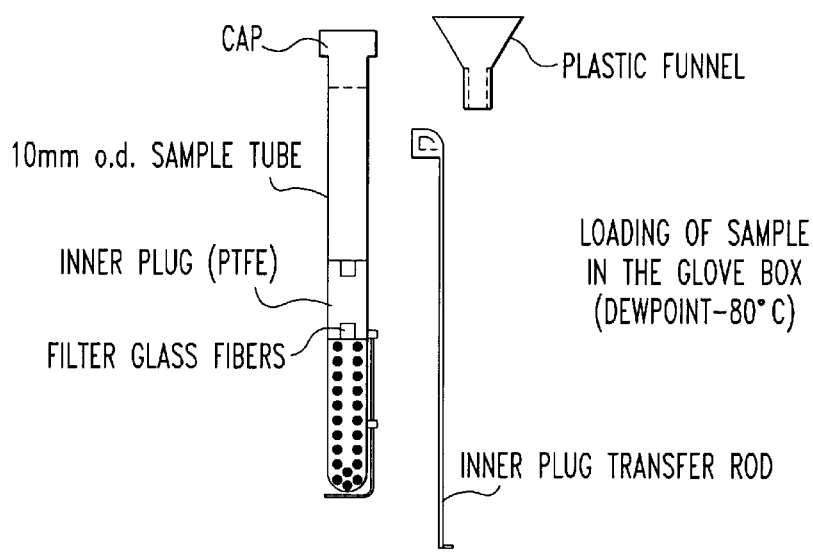
Figure 15:
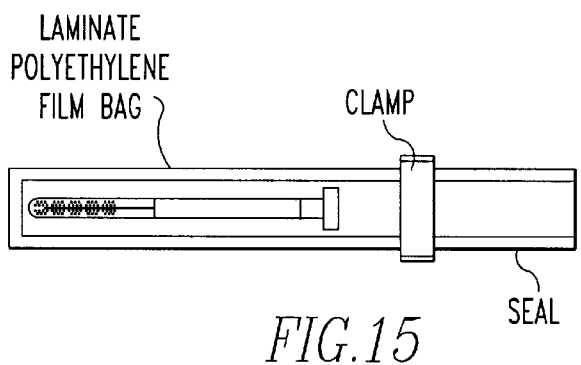

Preparation of a sample is schematically illustrated in FIG. 15. A small amount of sample is put into a long glass bottle. The bottle is placed in a long vat made of stainless steel or aluminium, and then the cover is placed loosely. A vacuum heating-and-bakeout furnace is prepared. A glove box having a dew point of approximately −80° C. or below is connected to the furnace. The long vat receiving the long glass bottles and samples is introduced into the furnace via the glove box. Subsequently, the sample is baked out slowly.

After the bakeout, the sample is transferred into the glove box and loaded into an NMR sample tube having a diameter of 10 mm as shown in FIG. 15. The sample is made stationary by an inner plug made of PETF. Filter glass fibers are loaded into the center of the inner plug to prevent the powder sample from going out despite a stream of the inside gas on insertion.

The tube is plugged up with a dedicated cap, inserted into a high-barrier laminate polyethylene film bag, and clamped. The tube is taken out of the glove box and thermally sealed.

The tube is preserved under the conditions described above. The seal is broken immediately prior to measurements, the sample tube is taken out, and the measurements are made. The sample filling length (L) and the net weight (W) of the carbon are used in correcting the sample filling.

2) Measurements

A first pulse having a measuring frequency of 25 MHz and a pulse width Pwl of 2.0 μsec is applied, and then a second pulse that has the same pulse width as that of the first pulse and is shifted in phase by 90° with respect to the first pulse is applied after a pulse interval Pil of 8.0 μsec. After a lapse of a duration Pil, an echo signal is observed. This sequence of operations (so-called solid echo sequence) is repeated 128–512 times at interval of 2.0 sec. The signal is accumulated, and data is collected.

Figure 16A:
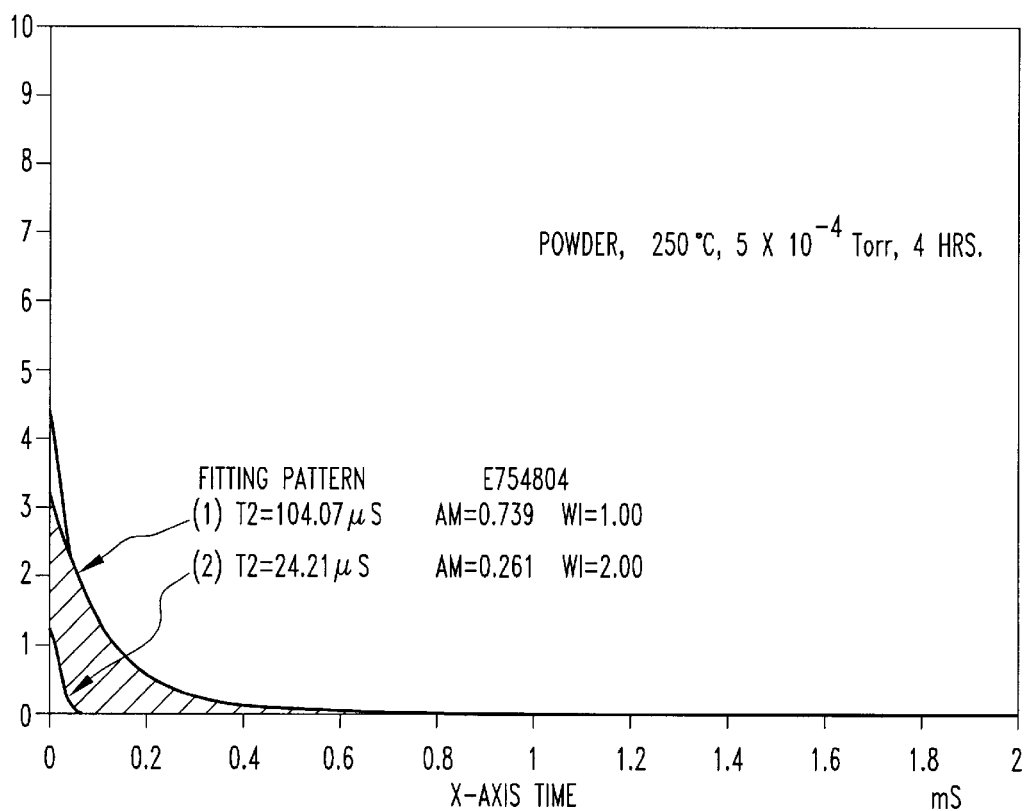
FIG. 16(a) is a chart showing the results of measurements of powdered nonporous carbon specimen [E754804] by pulse NMR.
Figure 16B:
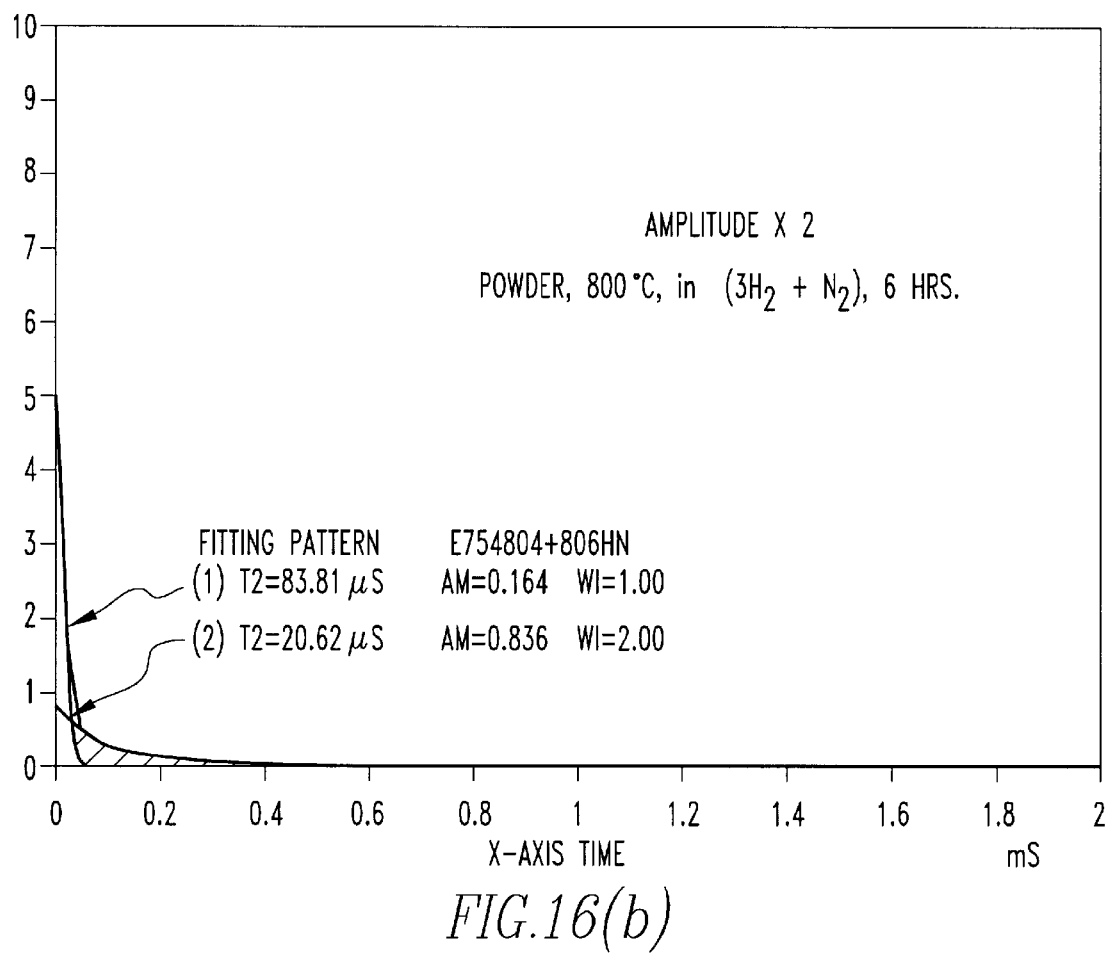
FIG. 16(b) is a chart showing the results of measurements of powdered, hydrogenated nonporous carbon specimen [E754804+806HN] by pulse NMR.

Some of the results of the analysis performed are shown in FIGS. 16(a) and 16(b), where the initial rising intensity indicates the total amount of hydrogen nuclides within the observed sample. The decay curve was analyzed. Combinations of components with different decay times were calculated, and line fitting was done. The results are shown in FIGS. 16(a) and 16(b). Carbon E arising from petroleum-based solidified pitch was thermally pretreated at 750° C. for 4 hours. The carbon was activated with two parts of KOH at 800° C. for 4 hours, thus producing nonporous carbon [E754804]. FIG. 16(a) indicates the results. The nonporous carbon was thermally post-treated within a hydrogen-nitrogen mixture stream at 800° C. for 6 hours, giving rise to hydrogenated nonporous carbon [E754804+806HN]. The results are indicated by FIG. 16(b).

It can be seen from FIGS. 16(a) and 16(b) that the moderate and short relaxation times of the nonporous carbon are 104.07 μsec and 24.21 μsec, respectively, and that their respective amounts are 0.739 and 0.261. The ratio of the moderate relaxation time component to the short relaxation time component is 0.739/0.261=2.83. The moderate and short relaxation time constants of the hydrogenated nonporous carbon are 83.81 μsec and 20.62 μsec, respectively. Their respective amounts are 0.164 and 0.836. The ratio of the moderate relaxation time constant to the short relaxation time constant is 0.164/0.836=0.20. It can be seen that thermal post-treatment is effective.

An electric double-layer capacitor was fabricated using the above-described nonporous carbon and an electrolyte solution consisting of 1 mol/liter solution of $Et_4N \cdot BF_4$. Generation of a slight amount of gas was observed but no practical problems occurred. This can also be said about nonporous carbons fabricated using other raw carbons and given below. Any nonporous carbon presents no practical problems as the material of an electric double-layer capacitor operating at 3–3.3 V.

Various relaxation time constants of nonporous carbons obtained similarly and their ratios are listed in Table 3.

TABLE 3

| kind | sample name | moderate relaxation time component (m), μsec | | short relaxation time component (s), μsec | | m/s |
|---|---|---|---|---|---|---|
| calcined carbon | A754 | 55.5 | 0.091 | 18.8 | 0.909 | 0.100 |
|  | B754 | 58.3 | 0.103 | 18.5 | 0.897 | 0.115 |
|  | C754 | 67.7 | 0.086 | 18.2 | 0.914 | 0.094 |
| nonporous carbon | A754802 | 213.3 | 0.655 | 44.5 | 0.345 | 1.89 |
|  | C754802 | 213.3 | 0.488 | 100.7 | 0.512 | 0.952 |
| hydrogenated nonporous carbon | A754802 + 504H | 926 | 0.137 | 24.2 | 0.853 | 0.159 |
|  | B754802 + 504H | 555 | 0.283 | 21.0 | 0.717 | 0.395 |
|  | C754802 + 504H | 147 | 0.247 | 20.2 | 0.675 | 0.366 |
|  | A754802 + 654H | 83.7 | 0.16 | 20.2 | 0.84 | 0.175 |
|  | B754802 + 654H | 97.7 | 0.15 | 20.2 | 0.85 | 0.185 |
|  | C754802 + 654H | 90.5 | 0.17 | 19.6 | 0.83 | 0.227 |
|  | A754802 + 806H | 169.6 | 0.108 | 22.7 | 0.892 | 0.122 |
|  | B754802 + 806H | 153.9 | 0.139 | 24.3 | 0.861 | 0.151 |
|  | C754802 + 806H | 145.8 | 0.126 | 22.6 | 0.874 | 0.145 |
| activated carbon | H | 140.9 | 0.082 | 22.0 | 0.918 | 0.089 |
|  | H + 806H | 142.4 | 0.065 | 20.7 | 0.935 | 0.069 |

Bonding of chemically adsorbed water occurs after activation by means of an alkali. It can be seen from Table 3 that removal of this chemically bonded water and direct bond of hydrogen to carbon of =C—H type are caused by thermal post-treatment.

The mechanism of generation of a capacitance where polarized electrodes are made of such a nonporous carbon is as follows. First, this carbon has almost no interface for forming electric double layers, entirely differently from the case of electrodes of activated carbon. In the case of electrodes of activated carbon, when the electrodes are immersed in an electrolyte solution, electric double layers have been already formed. This can be demonstrated by observing $^{14}$F NMR resonance of $BF_4^-$ ions by magic angle spinning that is a method of observing solid samples at high resolution.

In particular, in the case of activated carbon, with respect to an electrode not electrically energized at all, a free $BF_4^-$ peak is observed. In addition, $BF_4^-$ is observed as another peak on the higher magnetic field side. This is a component contributing to formation of electric double layers. It has been empirically found that this increases on the anode according to the amount of electric charge and decreases on the cathode. On the other hand, in the case of the nonporous carbon, only a free $BF_4^-$ is observed; any other peak does not appear on the higher magnetic field side. This proves the validity of the above-described theory.

Therefore, the reason a capacitor using the nonporous carbon in accordance with the present invention exhibits a capacitance is that when a voltage is applied to the electrode, electrolyte ions intrudes into the carbon structure electrochemically together with solvent, thus forming a new interface. In the nonporous carbon having a large interplanar spacing, the solvent is not decomposed. If a solvent having a smaller molecular volume is mixed in and used, this solvent acts as a medium for causing ions to go in and out. In this way, a new mechanism is created.

In all of the experiments described thus far, $(C_2H_5)_4N \cdot BF_4$ is used as an electrolyte. Solubility, degree of dissociation, and electrochemical stability are important for electrolytes. Of course, it can be estimated that sizes of ions also participate in the mechanism.

The homolog of alkyl ammonium that has the least molecular volume is $(CH_3)_4N^+$. However, its $BF_4$ salts and $PF_6$ salts have so low solubilities that they cannot be used. On the other hand, $(C_2H_5)_n(CH_3)_{4-n}N^+$ has a high solubility and a high degree of dissociation. We have examined this $(C_2H_5)n(CH_3)_{4-n}N^+$ with n=3 that is commercially available from MITSUBISHI CHEMICAL CORPORATION, Japan. The ion radius does not differ greatly from that of $(C_2H_5)_4N^+$. Also, similar results are obtained. Accordingly, we have tried $(C_4H_9)_4N \cdot BF_4$ that can be readily commercially available as a reagent. It seems that comparable solubility and degree of dissociation are obtained. However, the voltage at which intercalation starts has increased. The generated capacitance is only half to two thirds of that obtained in the case of $(C_2H_5)_4N^+$.

Where the electrolyte ions are $Bu_4N \cdot BF_4$, if a solvent containing ACN is used, the voltage at which intercalation starts is lowered compared where a solvent consisting only of PC is used. Also, the Werburg impedance has dropped but to a lesser extent than the case of $Et_4N \cdot BF_4$. These phenomena can be explained away by differences of ion sizes. That is, why the capacitance has decreased only to one half to two thirds is that ions of different sizes penetrate to different depths within a narrow space in the carbon structure. It is considered that impedance differences are created by migration velocity differences. In particular, if it is assumed that the migration velocity is inversely in proportion to the square of Stokes radius (i.e., cross-sectional areas of ions), $Bu_4N^+$ is $(204/471)^2$ of $Et_4N^+$=0.187. The Stokes radius is described in "Solution Chemistry", by Nishi Ohtaki, Shokabo Publishing Company, Japan, p. 114, Table 6.3. The impedance is 5.3 times as large as the impedance of $Et_4N^+$. The validity of this consideration is supported by the fact that results of measurements where the charging and discharging current is reduced to one fifth show similar characteristic curves. The present invention is hereinafter described in further detail by its specific examples.

EXAMPLE 1

Nonporous carbons were prepared by the following sequence of operations, and electric double-layer capacitors were fabricated.

(1) Thermal Pretreatment of Raw Material

Petroleum-based needle coke A was pulverized by a pulverizer and powder with sizes of less than 120 μm was recovered with a standard sieve. This powder sample was metered and put into a crucible. The sample was dry distilled at 750° C. for 4 hours within a stream of nitrogen. A slight amount of volatile components was produced, and dark tar-like substance and yellow-orange crystal deposited on portions remote from the center of the furnace. These components were dissolvable in isoquinoline to different degrees.

(2) Activation with Alkali

Then, the carbon left in the crucible was put into a crucible of high-purity aluminum, and 20 parts by weight of fine particles of KOH were added to 10 parts by weight of the carbon. They were mixed up well. The mixture was thermally treated at 800° C. for 4 hours within a stream of nitrogen to activate the mixture. After the mixture was allowed to stand to cool it, a carbon containing a large amount of $K_2CO_3$ or $K_2O$ and metal K was put into a beaker together with the crucible. The mixture was washed out with a large amount of $H_2O$, thus obtaining slurried carbon suspended in a strong alkali water.

(3) Washing

The liquid was filtered through a low-pressure filtering bottle using a GA-100 glass filter of 1 μm. The carbon was recovered together with the filter paper and dried with hot air. A maximum amount of carbon was recovered from the filter paper and loaded into an LC column made of stainless steel. Distilled water was pumped through the column. The temperature of the column was maintained at 150° C., and the column was washed with water vapor. The washing operation was carried out until the pH reached about 7.0. After the washing, Ar gas was passed through the column to roughly dry it. Thus, nonporous carbon [A754804] was obtained.

(4) Thermal Post-Treatment

Some of the carbon materials used for the electric double-layer capacitors were heated within a stream of hydrogen as an additional processing step. That is, the above-described nonporous carbon was again put into a crucible and thermally treated at 500° C.–900° C. within a stream of hydrogen or hydrogen-nitrogen mixture gas for 2 to 6 hours. In this way, hydrogenated nonporous carbon was derived.

(5) Kneading

Carbon (nonporous carbon or hydrogenated nonporous carbon) containing no alkali components was recovered into a mortar and heated and vacuum dried at 200° C. for about 2 to 4 hours up to 0.1 Torr. Carbon black (available as Denka Black from Denki Kagaku Kogyo Co., Ltd., Japan) and PTFE binder (available from Mitsui-DuPont Fluorochemicals Co., Ltd. (Japan)) were added, and the mixture was mixed and kneaded with a pestle. One example of the weight ratio between the carbon, carbon black, and PTFE binder is 10:0.5:0.25.

(6) Rolling

Depending on the degree of the kneading, viscosity might be imparted to the carbon. The carbon was then packed in aluminum foil until the carbon was shaped into a sheetlike form. The carbon was applied to hot rollers, and then the aluminum foil was removed. The carbon was finished as a sheetlike form. In the obtained sheet-like electrode, carbon particles and carbon black were uniformly distributed. They were mixed with PTEF fibers with almost identical intensities.

(7) Molding

The sheet-like electrode was cut into pieces having a diameter of 20 mm and a target thickness of less than 0.5 mm by a punching jig. Thus, carbon electrodes for testing were obtained. Their thicknesses and weights were measured to assemble a capacitor using the molded carbon electrodes. They were separately placed in dishes for immersion and placed into a heating-and-vacuum drying machine directly coupled with a glove box, together with a GA-100 separator. The electrodes were dried at 250° C. at $5 \times 10^{-5}$ Torr for 2 to 4 hours Then, they were moved into a vacuum immersion vessel, and the inside was evacuated to 0.1 Torr. Then, the electrolyte solution injection cock was opened to inject an electrolyte solution passed through an activated aluminum column. The amount of the injected liquid is such that the carbon electrode was sufficiently immersed. This was visually checked through a sight glass formed on the top of the vessel, by observing a change in the liquid level in the electrolyte solution bottle.

The electrolyte solution for immersion consisted mainly of 1 mol/liter $Et_4N \cdot BF_4$ propylene carbonate solution. After adding the electrolyte solution, the cock was operated to evacuate the inside of the vessel again. At this time, release of gas in the form of bubbles was observed from inside the carbon.

It took about 3 to 5 minutes until release of bubbles was no longer observed. Then, the cock was operated to release the pressure. The cover of the vessel was opened. The GA-100 separator containing the carbon electrode and the electrolyte solution was taken out. An electric double-layer capacitor was assembled by the following steps.

(8) Assembly of Capacitor

Aluminum collector electrodes previously roughened and having extractor electrodes previously sealed were prepared. Also, a paper separator and a high-barrier laminate film bag were prepared. Collector electrode A, carbon electrode A, GA-100 electrolyte solution retainer, the paper separator, carbon electrode B, and collector electrode B were stacked on top of each other in this order. The obtained lamination was picked up with a jig and inserted into the laminate film bag.

Then, the bag was clamped and taken out of the glove box. The bag was vacuum packed with a jig. A space was previously secured in the laminate film bag to store gas produced when an overvoltage is applied.

With respect to the obtained nonporous carbon, the interplanar spacing $d_{002}$ was measured by XRD. The specific surface area was measured by the BET method. Various relaxation time components were measured by pulse NMR. The characteristics of the obtained electric double-layer capacitor including the capacitance were measured.

Other Examples and Comparative Examples

Nonporous carbons and hydrogenated nonporous carbons were produced using the carbon raw materials as listed in Table 4 in the same way as in Example 1. However, the thermal pretreating conditions, activation conditions, thermal post-treating conditions, and other conditions were changed as described below. Electric double-layer capacitors were assembled using these carbons, and their characteristics were evaluated. As a comparative example, petroleum solidified pitch was used as a raw carbon and activated with water vapor to produce activated carbon H. Using this carbon H, electrodes were manufactured, and an electric double-layer capacitor was assembled. This capacitor was used for evaluation.

Preparation conditions were modified as follows. thermal pretreatment conditions: 750° C., 2 hours; 750° C., 4 hours activation conditions: 800° C., 2 hours; 800° C., 4 hours thermal post-treatment conditions: $H_2$, $N_2+H_2$ 650° C., 2 hours; 650° C., 4 hours, 650° C., 6 hours;

800° C., 2 hours, 800° C., 4 hours, 800° C., 6 hours

The nonporous carbons and hydrogenated nonporous carbons obtained as described above are herein denoted together with their raw carbons, activation conditions, and thermal post-treatment conditions. In particular, in the case of a nonporous carbon, its raw carbon is first indicated. The temperature at which a thermal pretreatment is made is denoted by two upper digits. The processing time is denoted by the third digit. The activation temperature is denoted by the fourth and fifth digits. The processing time is denoted by the sixth digit. In total, 6 digits are given to discriminate between different pretreatment conditions and activation conditions. In the case of a hydrogenated nonporous carbon obtained by performing a thermal post-treatment, symbol "+" is added after six digits. In the same way, upper two digits indicating a thermal post-treatment temperature and a lower one digit indicating a processing time are given. In total, three digits are attached. Where the processing atmosphere is a hydrogen stream, "H" is attached to the end. Where the atmosphere is a hydrogen-nitrogen mixture gas, "HN" is attached to the end. With respect to Example 1, the nonporous carbon is denoted by A754804. That of hydrogenated nonporous carbons which was thermally post-treated at 800° C. for 4 hours within a hydrogen stream is denoted by A754804+804H.

TABLE 4

|  | raw material | particle size |
| --- | --- | --- |
| petroleum-based coke A | petroleum coke | 1–40 μm |
| petroleum-based coke B | petroleum coke | 1–40 μm |
| petroleum-based coke C | petroleum coke | 1–40 μm |
| petroleum-based coke D | petroleum coke | 1–70 μm |
| petroleum solidified pitch E | petroleum solidified pitch | 1–140 μm |
| petroleum-based coke F | petroleum coke | 1–70 μm |
| petroleum solidified pitch H | petroleum solidified pitch | 1–70 μm |

The present invention is summarized based on the results of the examples described above. Each polarized electrode is made from a nonporous carbon containing K atoms. The carbon consists of crystallites having a multilayer graphite structure in which interplanar spacing $d_{002}$ lies from 0.360 nm to 0.380 nm. The carbon has no hetero atoms on its surface except for hydrogen atoms. The specific surface area is less than 270 m$^2$/g. Electrolyte ions having small radii and a high degree of dissociation exist at a concentration of at least 0.5 mol/liter in a solvent, are electrochemically stable, and are intercalated into the carbon structure by solvent co-intercalation during initial charging. New electric double-layer interfaces are created, thus storing electric charge. In this way, an electric double-layer capacitor based on a new mechanism is obtained.

This electric double-layer capacitor based on the above-described mechanism has a larger capacitance per unit volume of activated material than an electric double-layer capacitor using electrodes made of the prior art activated carbon. The novel capacitor can be operated at a higher voltage and, therefore, the amount of energy that can be stored is three or more times as high as the amount of storage energy heretofore achievable.

Where a mixture solvent containing a solvent having a small molecular volume (e.g., less than 71), intercalation and deintercalation of ions to and from the carbon structure are facilitated. This lowers the Werburg impedance, permitting fast charging and discharging.

Having thus described our invention with the detail and particularity required by the Patent Laws, what is desired protected by letters patent is set forth in the following claims.

What is claimed is:

1. An electric double-layer capacitor having polarized electrodes immersed in an organic electrolyte, said polarized electrodes being made of a nonporous carbon having crystallites of a multilayer graphite-like structure, said carbon being a nonporous carbon having a specific surface area of less than 270 $m^2/g$, said crystallites of the carbon having an interplanar spacing $d_{002}$ of 0.360 to 0.380 nm.

2. The electric double-layer capacitor of claim 1, wherein said specific surface area is less than 100 $m^2/g$.

3. The electric double-layer capacitor of claim 1 or 2, wherein said nonporous carbon forming the polarized electrodes shows a short relaxation time constant $T_2$=18–50 sec (Gaussian type), a moderate relaxation time component $T_2$=100 to 400 sec (Lorentzian type), and a long relaxation time component $T_2$=500 to 2000 sec or longer (Lorentzian type) when $^1H$ resonance is observed at room temperature by pulse NMR, said relaxation time components indicating different states of bond of hydrogen atoms left within the carbon structure, and wherein the ratio of the sum of the moderate and long relaxation times to the short relaxation time is less than one third.

4. The electric double-layer capacitor of claim 1, wherein each of said polarized electrodes assumes a sheet-like form and contains said nonporous carbon, a conductivity-promoting agent, and a binding agent, and wherein said polarized electrodes have a density of 0.8 to 1.3 $g/cm^3$.

5. The electric double-layer capacitor of claim 1, wherein a solution of said electrolyte is a non-proton polar organic solvent solution containing more than 0.5 mol/liter of an electrolyte selected from the group consisting of boric tetrafluoride salts of alkyl quaternary ammonium, phosphate hexafluoride salts, and perchlorate salts, and wherein said solvent has been prepared by selecting at least one from propylene carbonate, ethylene carbonate, dimethyl carbonate, diethyl carbonate, dimethoxyethane, diethoxyethane (DEE), and -butyl lactone as a solvent or a mixture solvent and compounding at least 30% molar fraction of acetonitrile or a solvent having molecular volume of less than 71 and a relative dielectric constant of more than 20.

6. The electric double-layer capacitor of claim 1, further including a volume-restricting means for suppressing expansion of volumes of said polarized electrodes in the direction of an electric field.

* * * * *

UNITED STATES PATENT AND TRADEMARK OFFICE
CERTIFICATE OF CORRECTION

PATENT NO. : 6,721,168 B2
DATED : April 13, 2004
INVENTOR(S) : Takeuchi et al.

It is certified that error appears in the above-identified patent and that said Letters Patent is hereby corrected as shown below:

<u>Title page,</u>
Insert Item -- [30]     Foreign Application Priroity Data
         July 4, 2000     (JP)............................. 2000-201849 --

Signed and Sealed this

Twenty-first Day of December, 2004

JON W. DUDAS
*Director of the United States Patent and Trademark Office*

UNITED STATES PATENT AND TRADEMARK OFFICE
CERTIFICATE OF CORRECTION

PATENT NO. : 6,721,168 B2
DATED : April 13, 2004
INVENTOR(S) : Takeuchi et al.

It is certified that error appears in the above-identified patent and that said Letters Patent is hereby corrected as shown below:

Title page,
Insert Item -- [30]   Foreign Application Priority Data
      July 4, 2000   (JP)............................ 2000-201849 --

This certificate supersedes Certificate of Correction issued December 21, 2004.

Signed and Sealed this

Twenty-third Day of August, 2005

JON W. DUDAS
*Director of the United States Patent and Trademark Office*